United States Patent
Sanford et al.

(10) Patent No.: US 7,942,678 B2
(45) Date of Patent: May 17, 2011

(54) CONNECTOR ASSEMBLIES

(75) Inventors: Emery A. Sanford, San Francisco, CA (US); M. Evans Hankey, San Francisco, CA (US); Christopher D. Prest, San Francisco, CA (US); Way Chet Lim, San Jose, CA (US); Toshihiko Kato, Tokyo (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/869,319

(22) Filed: Aug. 26, 2010

(65) Prior Publication Data

US 2011/0028041 A1  Feb. 3, 2011

Related U.S. Application Data

(63) Continuation of application No. 11/999,838, filed on Dec. 6, 2007, now Pat. No. 7,798,831.

(60) Provisional application No. 60/879,193, filed on Jan. 6, 2007, provisional application No. 60/879,195, filed on Jan. 6, 2007, provisional application No. 60/879,177, filed on Jan. 6, 2007, provisional application No. 60/937,873, filed on Jun. 28, 2007.

(51) Int. Cl.
   *H01R 12/00* (2006.01)
(52) U.S. Cl. .......................................... 439/83; 439/692
(58) Field of Classification Search .............. 439/37–40, 439/77, 83, 736, 500, 660, 692
See application file for complete search history.

(56) References Cited

U.S. PATENT DOCUMENTS

| | | | |
|---|---|---|---|
| 4,008,940 | A | 2/1977 | Foley |
| 4,273,969 | A | 6/1981 | Foley et al. |
| 5,816,841 | A | 10/1998 | Grant |
| 6,319,015 | B1 | 11/2001 | Faunce |
| 6,474,999 | B1 | 11/2002 | Givens et al. |
| 6,910,911 | B2 | 6/2005 | Mellott et al. |
| 7,056,127 | B2 | 6/2006 | Suzuki et al. |
| 7,311,526 | B2 | 12/2007 | Rohrbach et al. |
| 7,344,379 | B2 | 3/2008 | Marmaropoulos et al. |
| 7,351,066 | B2 | 4/2008 | DiFonzo et al. |
| 7,589,536 | B2 | 9/2009 | Terlizzi et al. |
| 7,798,831 | B2 | 9/2010 | Sanford et al. |
| 2004/0209489 | A1 | 10/2004 | Clapper |
| 2005/0202727 | A1 | 9/2005 | Andre |
| 2006/0045303 | A1 | 3/2006 | Akino |
| 2008/0024470 | A1 | 1/2008 | Andre et al. |
| 2008/0084404 | A1 | 4/2008 | Andre et al. |
| 2008/0164934 | A1 | 7/2008 | Hankey et al. |
| 2008/0166004 | A1 | 7/2008 | Sanford et al. |
| 2008/0167088 | A1 | 7/2008 | Rabu et al. |

FOREIGN PATENT DOCUMENTS

| | | |
|---|---|---|
| CN | 2524386 | 12/2002 |
| WO | 2006/126881 | 11/2006 |

*Primary Examiner* — Khiem Nguyen
(74) *Attorney, Agent, or Firm* — Kramer Levin Naftalis & Frankel LLP

(57) ABSTRACT

A headset connector assembly that includes a connector plate, a casing, and electrical contact members is provided. The connector plate can have a first mating surface, a second mating surface, and at least two apertures existing between the first and the second mating surfaces. The casing can have a first side in contact with the first mating surface and a second side. The casing can include a protruding cavity member for each of the at least two apertures. Each protruding cavity member can extend from the first side and be constructed to fit within one of the at least two apertures. Each protruding cavity member can house an electrical contact member.

27 Claims, 20 Drawing Sheets

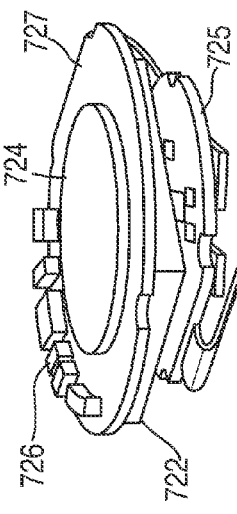
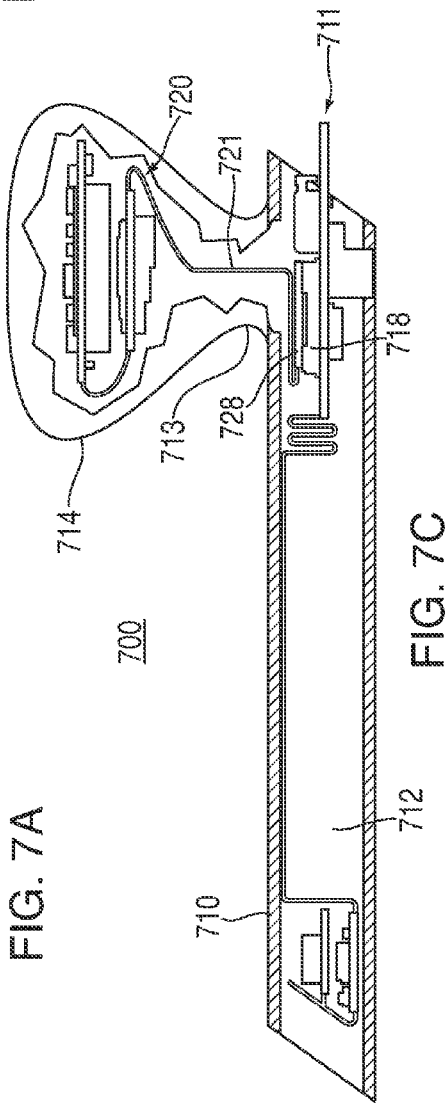
FIG. 7A
FIG. 7B
FIG. 7C

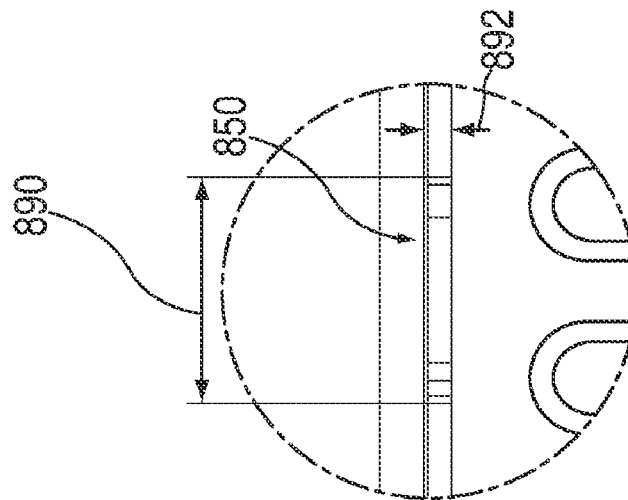
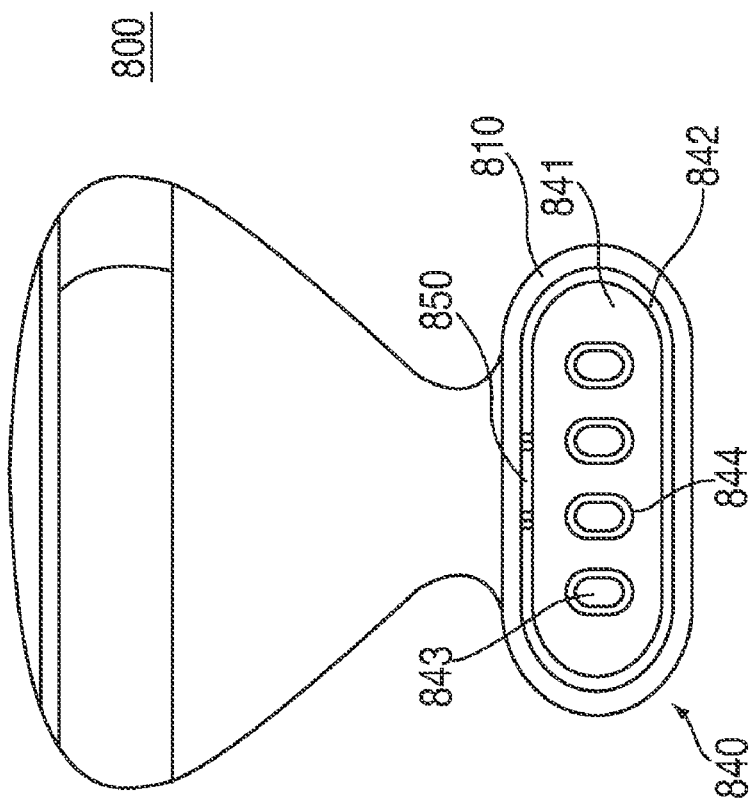

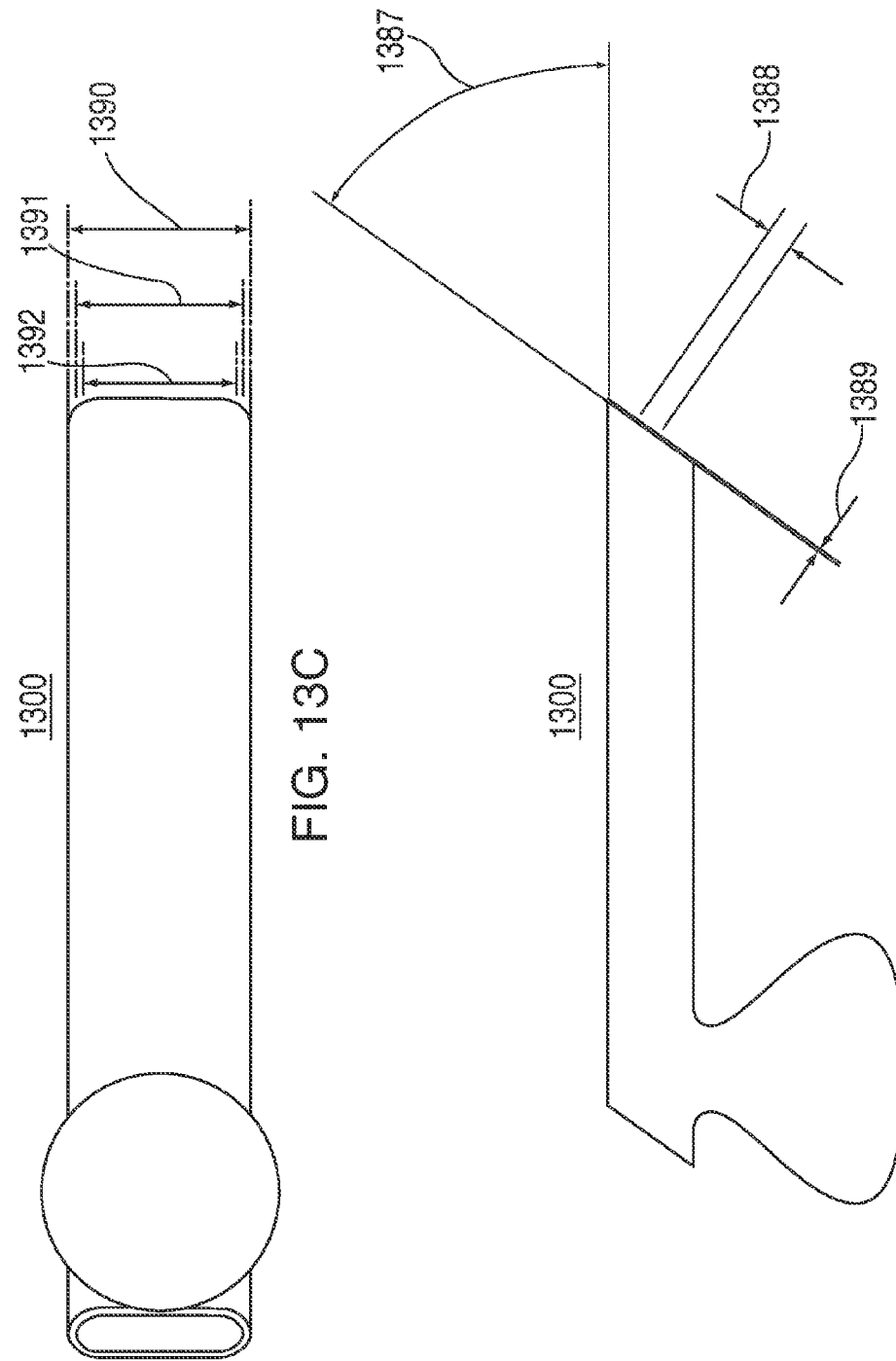

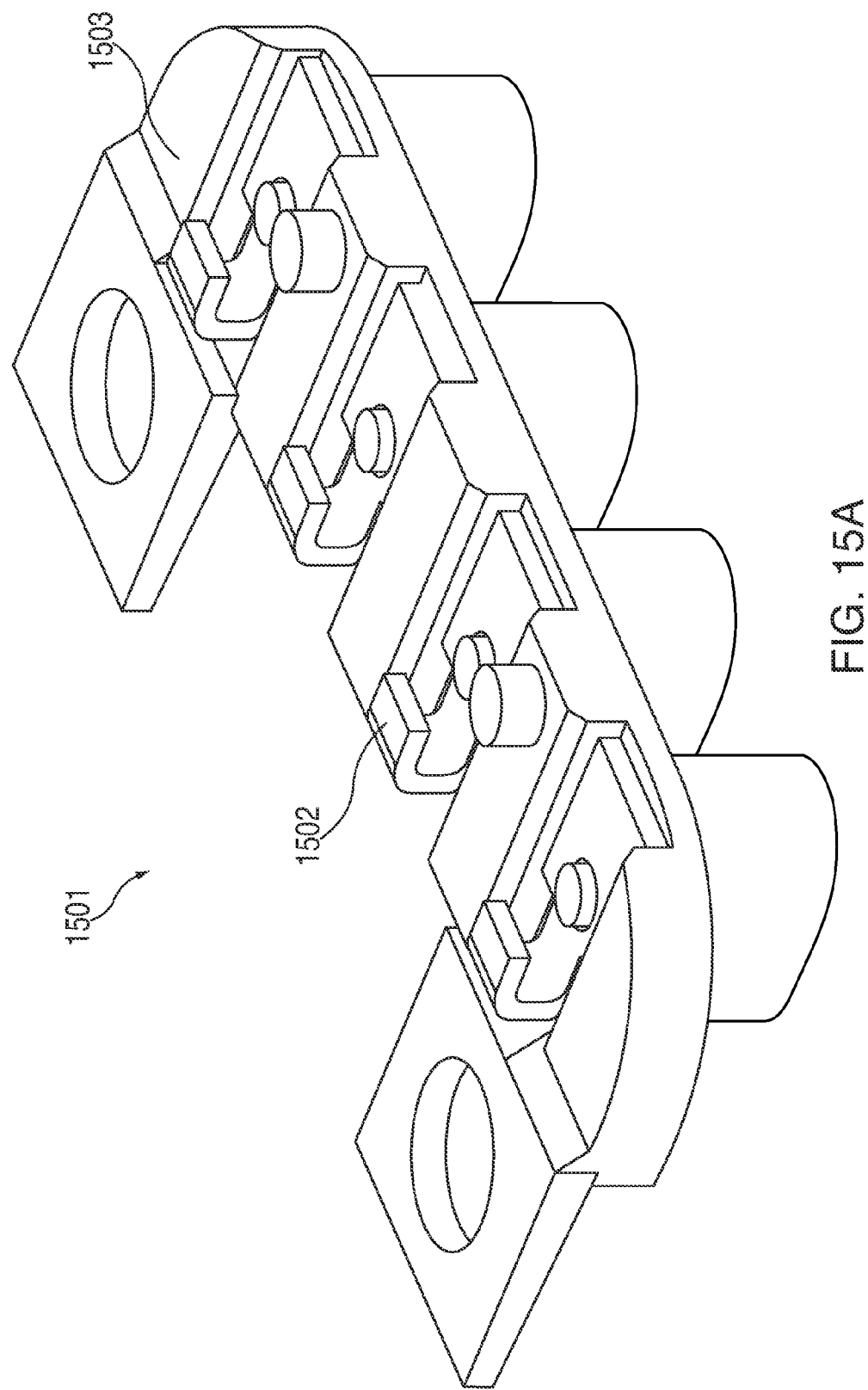

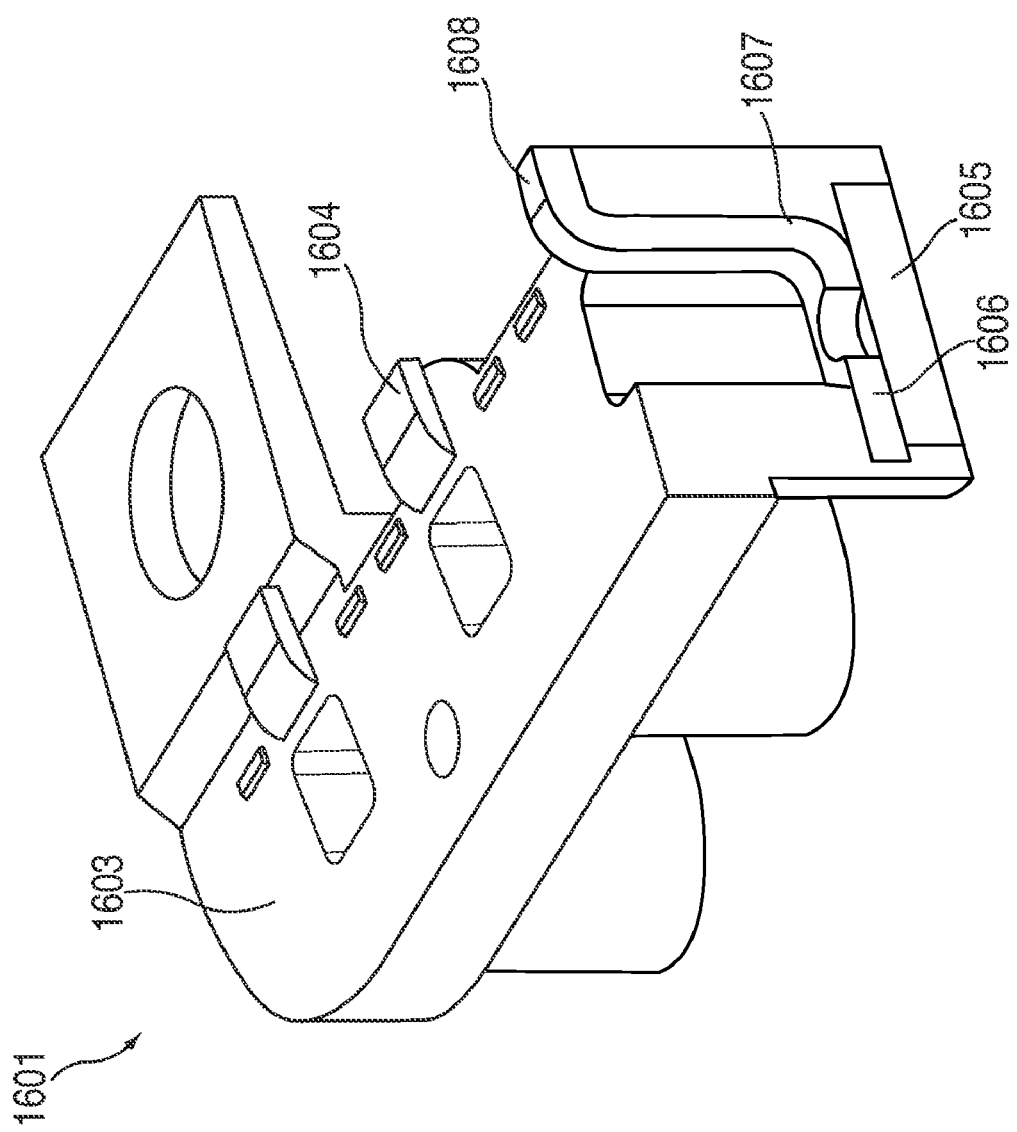

CONNECTOR ASSEMBLIES

CROSS REFERENCE TO RELATED APPLICATIONS

This application is a continuation of commonly-assigned U.S. patent application Ser. No. 11/999,838, filed Dec. 6, 2007 (now U.S. Pat. No. 7,798,831), which claims the benefit of certain copending, commonly assigned U.S. Provisional Patent Applications, namely, Ser. No. 60/879,177 filed on Jan. 6, 2007; Ser. No. 60/879,193 filed on Jan. 6, 2007; Ser. No. 60/879,195 filed on Jan. 6, 2007; and Ser. No. 60/937,873 filed on Jun. 28, 2007. U.S. Provisional Patent Application Nos. 60/879,177; 60/879,193; and 60/879,195 are incorporated herein by reference.

Commonly assigned DiFonzo et al. U.S. patent application Ser. No. 11/235,873, filed Sep. 26, 2005, entitled "Electromagnetic Connector for Electronic Device," is hereby incorporated by reference in its entirety.

Commonly assigned Rohrbach et al. U.S. patent application Ser. No. 11/235,875, filed Sep. 26, 2005, entitled "Magnetic Connector for Electronic Device," is hereby incorporated by reference in its entirety.

Commonly assigned Andre et al. U.S. patent application Ser. No. 11/456,833, filed Jul. 11, 2006, entitled "Invisible, Light-Transmissive Display System" is hereby incorporated by reference in its entirety.

Commonly assigned Andre et al. U.S. patent application Ser. No. 11/551,988, filed Oct. 23, 2006, entitled "Invisible, Light-Transmissive Display System" is hereby incorporated by reference in its entirety.

Commonly assigned Sanford et al. U.S. patent application Ser. No. 11/651,094, filed Jan. 6, 2007, entitled "Antenna and Button Assembly for Wireless Devices" is hereby incorporated by reference in its entirety.

Commonly assigned Terlizzi et al. U.S. patent application Ser. No. 11/650,130, filed Jan. 5, 2007, entitled "Systems and Methods for Determining the Configuration of Electronic Connections" is hereby incorporated by reference in its entirety.

Commonly assigned Rabu et al. U.S. patent application Ser. No. 11/620,669, filed Jan. 6, 2007, entitled "Apparatuses and Methods that Facilitate the Transfer of Power and Information Among Electrical Devices" is hereby incorporated by reference in its entirety.

Commonly assigned Hankey et al. U.S. patent application Ser. No. 11/824,203, filed Jun. 28, 2007, entitled "Connectors Designed for Ease of Use" is hereby incorporated by reference in its entirety.

FIELD OF INVENTION

The present invention can relate to headsets. More particularly, the present invention can relate to headsets for communicating with an electronic device.

BACKGROUND OF THE INVENTION

Headsets for providing hands-free communications are known in the art. Such headsets typically can be used in conjunction with a cellular telephone or a computer (e.g., Voice over IP). Some existing headsets include a microphone, a speaker (also referred to as a receiver), electronics for controlling the headset and communicating with another device (e.g., a cellular telephone), a battery and a connector for re-charging the battery.

There are many aspects involved in the design of headsets. For example, the size and weight of headsets can be key issues because of how they typically mount to a user's ear. A heavy or large headset can pull on a user's ear, creating an uncomfortable fit. The shape of headset earpieces (e.g., earbuds) may also be an important design consideration to take into account as it is desirable for earpieces to fit comfortably in, on, or over a wide range of different sizes and shapes of ears.

Additionally, the acoustic performance of headsets, such as receiver sound generation quality and microphone sound reception quality (e.g., ability to pick up a user's voice without undue background noise), can be important design considerations. Achieving desired receiver and microphone acoustic performance can become increasingly difficult as the size of a headset decreases.

Another example of an important design consideration can be the user interface of a headset. It may be desirable for a user interface to be intuitive for a first-time user, yet convenient for an experienced user.

Aesthetics may be yet another important design consideration for headsets.

Further still, ease of manufacturing headsets can be another design consideration. For example, it can be desirable to design a headset that can be mass produced in an affordable fashion.

In view of the foregoing, there is a need for an improved headset that addresses one or more of the above-identified considerations.

SUMMARY OF THE INVENTION

In accordance with one embodiment of the present invention, a headset connector assembly that includes a connector plate, a casing, and electrical contact members is provided. The connector plate can have a first mating surface, a second mating surface, and at least two apertures existing between the first and the second mating surfaces. The casing can have a first side in contact with the first mating surface and a second side. The casing can include a protruding cavity member for each of the at least two apertures. Each protruding cavity member can extend from the first side and be constructed to fit within one of the at least two apertures. Each protruding cavity member can house an electrical contact member.

In accordance with another embodiment of the present invention, a headset connector assembly that includes a connector plate, a non-conductor casing, and at least one electrical contact is provided. The connector plate can have a first side and a second side. The non-conductor casing can be mounted to the first side of the connector plate and constructed to house at least one electrical contact. At least one electrical contact can be mounted to the casing. At least one electrical contact can have a surface plane parallel to the second side of the connector plate.

BRIEF DESCRIPTION OF THE DRAWINGS

The present invention will be apparent upon consideration of the following detailed description, taken in conjunction with accompanying drawings, in which:

FIGS. 7A-7C are illustrations of an improved distribution of electrical components in a headset in accordance with an embodiment of the present invention;

FIGS. 8A and 8B are illustrations of a headset in accordance with an embodiment of the present invention;

FIGS. 13A-13D are illustrations of a headset in accordance with an embodiment of the present invention;

FIGS. 15A and 15B are illustrations of an electrical contact assembly in accordance with an embodiment of the present invention;

FIGS. 16A-16C are illustrations of an electrical contact assembly in accordance with an embodiment of the present invention.

DETAILED DESCRIPTION OF THE INVENTION

Figure 1:
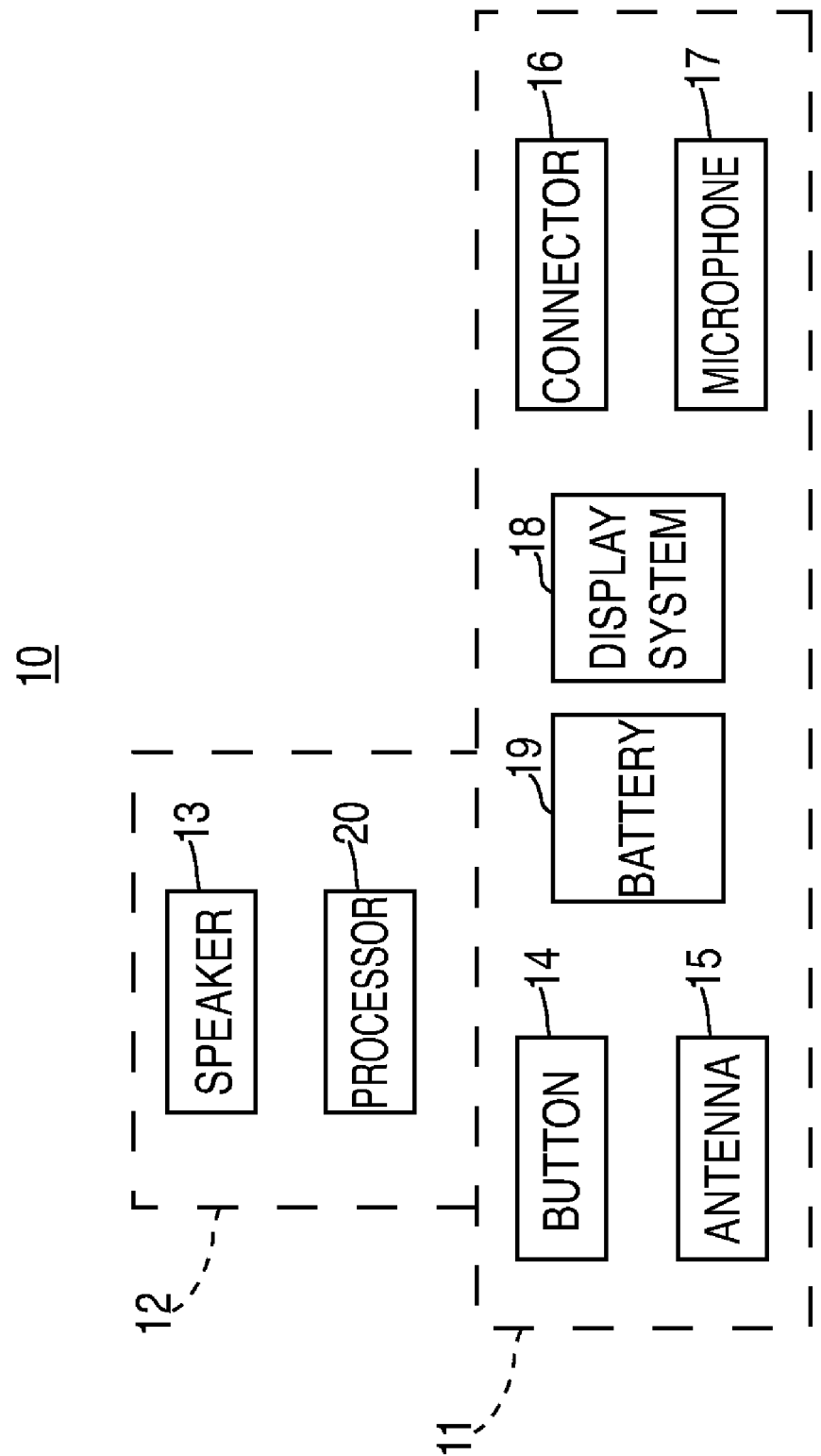
FIG. 1 is a simplified block diagram of a headset in accordance with an embodiment of the present invention.

The present invention relates to headsets and methods for manufacturing the same. Headsets are communication devices that are worn on a user's head in order to allow hands free data and/or voice communication with a host device such as a computer, phone handset, cellular phone, an automobile and/or the like. Headsets can include one or more speakers (in proximity to one or both ears) for audio output and/or one or more microphones for audio input.

Headsets can come in a variety of form factors or shapes. In some cases, headsets can be embodied as an earpiece that serves as the primary support mechanism for wearing the headset. For example the headset may be supported on the head by an earpiece worn over or in the ear. Alternatively, the headset may be supported by a frame or band that fits on or over the user's head. The headset may include a fixed or movable boom that places the microphone closer to the user's mouth (wraps around the face). Alternatively, the headset may be boomless such that the microphone is integrated with the earpiece thereby forming a more compact device (e.g., smaller, lighter, more aesthetically pleasing, etc.).

According to one aspect of the invention, the headset can be embodied as a small compact unit including a primary-housing and an earbud member extending therefrom. The earbud member may be attached to or integrally formed with the primary housing. Various components can be placed at the surface of or within the confines of the earbud member and the primary housing. In fact, both of them can include one or more components depending on the needs of the device. The components contained within each of these can be widely varied. Examples of operational components can include speakers, microphones, antennas, connectors, buttons, displays, indicators, battery, and associated processors, controllers and circuitry. Generally, the earbud member includes at least a speaker while the primary housing includes at least a microphone (although this is not a requirement). Depending on their size, each of these members can include additional components of the headset. In one embodiment, the primary housing includes an antenna, user interface button, indicator or display (e.g., LEDs), battery, microphone, and/or a connector along with any accompanying circuitry while a speaker, a processor, and its accompanying circuitry can be located in the earbud. The button can be located on one end of the main housing. A user can interface with this button to perform various functions (e.g., terminating calls).

The shape and size and orientation of the earbud member and primary housing can be widely varied. In one embodiment, the earbud member is configured for insertion into the ear such that it supports the remaining portions of the headset (e.g., primary housing) proximate the user's head. In one embodiment, the primary housing can be configured as a longitudinal member (e.g., a tube). In one example, an earbud member, which contains a speaker, perpendicularly protrudes away from one end of a longitudinally extending primary housing, which includes a microphone at an opposite end of the longitudinally extending primary housing. Furthermore, the earbud member can expand outwardly and then inwardly from a neck portion that couples to the primary housing in order to form a bud that fits into an ear.

The primary housing can include a tube that forms a housing and receives internal components through an open end. The tube can be manufactured using one of several processes in order to reduce costs and increase speed and efficiency. In one embodiment, the tube can be manufactured to include features on the inner surface of the tube for supporting electronic components of the headset. Processes for creating such a tube can include applying a die and stamp to an extruded tube, single or double impact extrusion, or a progressive deep draw process.

The headset can include a hollow neck between the earbud and the primary housing in order to allow electrical wires to connect sets of discrete electronics disposed within the earbud and primary housing. In one embodiment, dual threaded inserts can be used to structurally reinforce the hollow neck without adding size to the device.

Small compact headsets have limited surface area for placing components. Therefore, one aspect of the invention relates to integrating multiple components into the same surface area of the headset in order to help form a small compact headset. Put another way, multiple components can be built into the same location on the headset in order to achieve the desired level of functionality without impacting a desired small size of the headset. The components may for example be selected from connectors, microphones, speakers, buttons, indicators, displays and/or the like. In one embodiment, an antenna and a button function at the same location of the headset. In another embodiment, a microphone and connector function at the same location of the headset. Other embodiments can also be realized. For example, a button can function at the same location of a speaker (e.g., at an earbud) or an indicator can function at the same location of a microphone.

Small compact headsets also have limited internal volume for placing internal components. Therefore one aspect of the invention relates to dividing/separating internal electronic assemblies into small multiple components that can be positioned at different locations (discretely) within the headset. By way of example, the electronics that would normally be embodied on a single large circuit board may be divided/ separated out and placed on multiple smaller circuit boards, each of which can be positioned at different locations within the headset. The smaller circuit boards can be more easily placed within various small internal pockets found in a small compact device. Flexible wires and possibly wireless protocols can be used to operatively couple the electronics and/or discrete circuit boards together. In other words, a first portion of the electronics may be separated from a second portion of the electronics, and further the first portion may be positioned at a first location within the headset while the second portion may be positioned at a second location within the headset. Note that, two portions is not a limitation and the electronics can be divided into any number of smaller discrete portions.

Along a similar vein, another aspect of the invention relates to electronic assemblies that are partially flexible or bendable such that the assemblies can be folded into a small compact form in order to fit inside tightly spaced internal volumes. By way of example, the electronics that would normally be embodied on a single rigid circuit board may be placed on multiple rigid circuit boards that are interconnected by flexible or bendable circuit board portions that can be bent around various internal shapes and/or folded over itself while still functioning properly.

Another aspect of the invention relates to acoustical paths, ports and volumes that are built through a small compact headset in order to improve acoustical performance of the microphone and/or speaker (with limited impact on the form factor of the headset). In one embodiment, in order to control the flow of air through an earbud, acoustic ports can be integrated into one or more electronic components disposed therein and/or the earbud housing. In another embodiment, at least some of the ports that pass through the various housings are substantially hidden from view thereby enhancing the aesthetic appearance of the headset. For example, the ports may be positioned within a seam between two interfacing external surfaces of the headset. In one example, a first external surface is provided by the open end of a tube of the primary housing and the second external surface is provided by an end member disposed within the open end of the tube of the primary housing. The end member may for example include a connector assembly thereby integrating a connector with a microphone into the same surface area.

In accordance with one aspect of the invention, the connector assembly can include contacts for the transfer of power and data. The connector can be located on the end of the primary housing opposite a user interface button. The connector can have a symmetrical configuration so that it can be coupled with complementary connectors in more than one interface orientation (e.g., 90 degree symmetry, 180 degree symmetry, etc.). In one embodiment, switching circuitry can be included in order to accommodate this symmetry. Such circuitry can, for example, measure the polarity of data and/or power lines from the complementary connector to determine its interface orientation and route the data and/or power lines based on the determined orientation. In some embodiments, the connector assembly can be at least partially made of a ferromagnetic material, which can serve as an attraction plate for one or more magnets on a complementary connector in another device (e.g., a headset charger).

In accordance with another aspect of the invention, the headset can include an indicator that is hidden from view when inactive and that is in view when active. This can for example be accomplished with micrometer sized holes, called microperforations, that can be drilled into the wall of primary housing and/or earbud member. Through these holes, light sources on the inside of the primary housing and/or earbud member can create visual indicators for a user. A light diffuser can be used in combination with such microperforations so that the indicator can be illuminated with evenly distributed light.

Headsets may communicate with the host device via a wired and/or wireless connection. Wired connections may for example occur through a cable/connector arrangement. Wireless connections on the other hand can occur through the air (no physical connection is needed). The wired and wireless protocols may be widely varied. Wired protocols may for example be based on Universal Serial Bus (USB) interfaces, Firewire interfaces, conventional serial interfaces, parallel interfaces, and/or the like. Wireless protocols may, for example, be based on short range transmissions of voice and/or data. The wireless protocols may further be used to create personal area networks between the headset and a nearby host device such as a cellular phone. Some examples of wireless protocols that can be used include Bluetooth, Home RF, iEEE 802.11, IrDA, Wireless USB, and the like. The communication electronics may be embodied as a system on a chip (SOC).

Although other wireless protocols may be used, according to one aspect of the invention, the headset can include communication electronics based on the Bluetooth wireless protocol. The communication electronics may, for example, include or correspond to a Bluetooth System-on-a-Chip (SoC). The SoC can include circuitry for performing functions other than wireless communications. For example, in some embodiments, circuitry for communicating using wired Universal Serial Bus (USB) interfaces and conventional serial interfaces can be integrated into the SoC.

For increased functionality, according to one aspect of the invention, the headset can include power distribution circuitry. Such circuitry can operate the headset according to several different modes depending, for example, on the charge level of the battery or the availability of an external power source. In one mode, the power distribution circuitry can supply power to limited parts of the SoC while simultaneously charging the battery. The battery charging process can be further improved by using temperature detection circuitry (e.g., a thermistor) to monitor the battery temperature. This process can extend the battery life by charging it only when the monitored temperature is at, or below, a predetermined threshold. In another mode, the power distribution circuitry can selectively power various electronic components using the battery while other electronic components may be powered by an external power source.

Aspects and embodiments of the invention are discussed below with reference to FIGS. 1-17B. However, those skilled in the art will readily appreciate that the detailed description given herein with respect to these figures is for explanatory purposes as the invention extends beyond these limited embodiments.

FIG. 1 is a simplified block diagram of headset 10 in accordance with one embodiment of the present invention. Headset 10 can be configured to be a small compact unit in the form of a simple earpiece that can be placed in the ear. The headset can include a primary housing 11 and an earbud 12 that extends from the primary housing. Earbud 12 can fit into an ear thereby placing the primary housing next to a user's face. Each of these members can surround and protect various internal components and can also support thereon various external components associated with operating the headset. The components may be a plurality of electrical components that provide specific functions for the electronic device. For example, the components may generally be associated with generating, receiving, and/or transmitting data associated with operating the device.

Headset 10 includes processor 20 for controlling the headset's functions. In the illustrated embodiment, processor 20 can be provided in earbud 12. In other embodiments, processor 20 can be located anywhere in headset 10. Processor 20 can be electrically coupled to the other components of headset 10 through circuit boards and/or cables. Processor 20 may facilitate wireless communications with a host device. For example, processor 20 can generate signals for wireless transmission and process received wireless signals. In addition to wireless communications, processor 20 may coordinate the operation of the various components of headset 10. For example, processor 20 may control the charging of a battery or the operation of a display system.

Headset 10 also includes speaker system 13 for distributing audio information from earbud 12. Speaker system 13 can include an audio port at the end of the earbud and a receiver (e.g., a speaker) disposed at the end of the audio port. The audio port may be covered with a grill. Speaker system 13 may also include various ports internal and external to the earbud. For example, speaker system 13 may include acoustical paths inside the earbud and acoustical paths that pass through the surfaces of the earbud.

Headset 10 also includes one or more input mechanisms for providing inputs to the headset. The input mechanism may be placed at the primary housing and/or the earbud. The input mechanisms may be widely varied and may include for example slide switches, depressible buttons, dials, wheels, navigation pads, touch pads, and/or the like. For simplicity purposes, the headset may only include a single input mechanism. Furthermore, for aesthetical reasons, the input mechanism may be placed at a select location. In other embodiments, two or more input mechanisms may reside on the headset.

In one embodiment, headset 10 includes single button 14 located at one end of primary housing 11. Placing button 14 at the end preserves the side surfaces of primary housing 11. This can also be accomplished by configuring earbud 12 as a button (e.g., the earbud is depressible relative to the primary housing). Earbud 12 may also be configured to tilt, rotate, bend and/or slide in order to provide inputs while preserving the side surfaces of primary housing 11.

Headset 10 also includes a communication terminal for communicating with a host device. The communication terminal may be configured for wired or wireless connections. In the illustrated embodiment, the communication terminal is antenna 15 that supports wireless connections. Antenna 15 may be located internal to the primary housing or earbud. If the primary housing or earbud is not formed from a radio transparent material then a radio transparent window may need to be provided. In the illustrated embodiment, antenna 15 is located at one end of the headset. Placing antenna 15 and the accompanying radiotransparent window at the end preserves the side surfaces of primary housing 11. In one embodiment, button 14 and antenna 15 are integrated at the same end.

Headset 10 may also include one or more connectors 16 for transferring data and/or power to and from the headset. A data connection allows data to be transmitted to and received from a host device. A power connection, on the other hand, allows power to be delivered to the headset. The connectors may for example connect to a corresponding connector in a dock or cable in order to connect to a power source for charging and/or a data source for downloads or uploads. Although the location of the connector can be widely varied, in the illustrated embodiment, connector 16 is located at one of the ends in order to preserve the side surfaces of the primary housing.

In some embodiments, connector 16 and corresponding connectors may be shaped such that the two connectors can mate in two or more different interface orientations. To compensate for this possibility, headset 10 can include switching circuitry that is coupled to connector 16. Such switching circuitry can determine how connector 16 is coupled with a corresponding connector (e.g., how the connectors are physically orientated). Switching circuitry can determine this by measuring, for example, the polarity of data and/or power lines from the complementary connector. Switching circuitry can then route the data and/or power from the connector to other circuitry in headset 10 appropriately. In some embodiments, at least a portion of connector 16 can be magnetic or magnetically attractive. For example, connector 16 may include a ferromagnetic material that biases it to magnetic connectors. Such magnetic interactions can assist a user in coupling connector 16 with corresponding connectors and help prevent the connectors from uncoupling.

Headset 10 also includes microphone 17 for capturing speech provided by a user. The microphone is typically located internal to the primary housing. One or more acoustical ports may be configured into the primary housing in order to provide an acoustical path from outside the primary housing to the microphone. The location of the acoustical ports can be widely varied. In one embodiment, the acoustical ports are located at one end of the primary housing in order to preserve the sides of the primary housing. In one embodiment, the connector assembly and acoustical ports are integrated at the same end. Furthermore, the acoustical port may be configured to be substantially hidden from view by selective placement of the ports. For example, the ports may be placed at the seam between the connector assembly and the primary housing.

Headset 10 also includes display system 18 for providing visual feedback. The display system may be a complex display system comprising an LCD or other related display device capable of displaying graphical information and/or it may be an indicator assembly that only provides simple visual feedback as for example via an LED assembly. In one embodiment, the display system only comprises an indicator assembly that provides visual feedback along the side walls of the primary housing. In order to preserve the side walls, however, the indicator assembly may be hidden when inactive. This can be accomplished, for example, through microperforations through the primary housing. The microperforations allow light to pass through, but are so small that they are undetectable to a user.

Headset 10 also includes battery 19. Battery 19 may provide electrical power to components of headset 10. Charging circuitry may also be provided to charge battery 19 when an external power supply is connected to headset 10.

Headset 10 can also include support circuitry for the aforementioned components. For example, this may include circuit boards, various electrical components, processors and controllers. The support circuitry can be placed inside the primary housing and/or the earbud. In one embodiment, the support circuitry can be split or divided between the two locations in order to make a more compact device, i.e., the various electronics are distributed among volumes as needed. In order to further save space, the electronics may be stackable. In one embodiment, the electronics are placed on a circuit board with one or more flexible portions so that a stack is created by folding or bending the circuit board.

Although earbud 12 and primary housing 11 can be integrally formed, in the illustrated embodiment, the primary housing and earbud are separate housing members that are attached together. Any suitable means can be used to attach the two parts together including but not limited to screws, glues, epoxies, clips, brackets, and/or the like.

The position of the earbud relative to the primary housing may be widely varied. For example, the earbud may be placed at any external surface (e.g., top, side, front, or back) of the primary housing. In one embodiment, the earbud is located on a planar front side near one of the ends of the primary housing. In one embodiment, the earbud may be configured to move relative to the primary housing so that its position can be adjusted.

Each of the earbud 12 and primary housing 11 can be configured to surround its internal components at a peripheral region thereof so as to cover and protect the internal components. They can also be configured to support components externally if needed. Each of earbud 12 and primary housing 11 help define the shape and form of the headset. That is, their contours embody the outward physical appearance of the headset. Such contours may be rectilinear, curvilinear or both. In one embodiment, earbud 12 is formed as an outwardly extending protruding member while primary housing 11 is formed as a longitudinally extending member. For example, earbud 12 may be coupled to primary housing 11 through a neck, which can be a portion of the primary housing, earbud or a separate piece altogether. The axis of earbud 12 and primary housing 11 can be transverse, and more particularly perpendicular. The shapes of earbud 12 and primary housing 11 may be widely varied. In one embodiment, earbud 12 is formed as a reverse rounded circular conical member and primary housing 11 is configured with a pill shaped cross section. It is understood however that these are not limitations and that the form, shape, and orientation may vary according to the specific needs or design of the headset. By way of example, earbud 12 and primary housing 11 may have various cross-sectional shapes including for example, circular, square, rectangular, triangular, oval, and/or the like. In addition, their form may be such that they do not have a typical straight axis.

Earbud 12 and primary housing 11 may be formed by one or more members. In one embodiment, primary housing 11 may include an integrally formed member. By integral, it is meant that the member is a single complete unit. By being integrally formed, the member can be structurally stronger than conventional housings, which include two parts that are fastened together. Furthermore, unlike conventional housings that have a seam between the two parts, the member has a substantially seamless appearance. Moreover, the seamless housing can prevent contamination and can be more water resistant than conventional housings. The primary housing may, for example, be formed as a tube that defines a cavity therethrough between a first open end and second open end located opposite the first open end. In order to seal the ends of the tube, the primary housing can additionally include a pair of end caps. Each of the end caps can be configured to cover one of the open ends thereby forming a fully-enclosed housing system. The end caps may be formed from similar or different materials as the tube. Furthermore, the end caps may be attached to the tube using a variety of techniques, including but not limited to, fasteners, glues, clips, brackets, and/or the like. The end caps can also be movably attached, and be configured to carry operational components of the headset.

It is understood that the inner cross-sectional shape of primary housing 11 may be the same or different from the external cross-sectional shape of the primary housing. For example, it may be desirable to have a pill shaped external and a rectangularly shaped interior, etc. In addition, although not a requirement, the front and back surface of primary housing 11 may be substantially planar.

In one embodiment, primary housing 11 can be formed via an extrusion or related process. The extrusion process is capable of producing an integral tube without seams, crack, breaks, etc. As is generally well known, extrusion is a shaping process where a continuous work piece is produced by forcing molten or hot material through a shaped orifice, i.e., the extrusion process produces a length of a particular cross-sectional shape. The cross-sectional shape of the work piece is controlled at least in part on the shaped orifice. As the shaped work piece exits the orifice, it is cooled and thereafter cut to a desired length. The extrusion process is a continuous high volume process that produces intricate profiles and that accurately controls work piece dimensions (which can be a necessity for smaller parts). Furthermore, because extrusion has low tooling costs, it is relatively inexpensive when compared to other forming or manufacturing processes.

Primary housing 11 may be formed from a variety of extrudable materials or material combinations including but not limited to metals, metal alloys, plastics, ceramics and/or the like. By way of example, the metals may correspond to aluminum, titanium, steel, copper, etc., the plastic materials may correspond to polycarbonate, ABS, nylon, etc, and the ceramic materials may correspond to alumina, zirconia, etc. Zirconia may, for example, correspond to zirconia oxide.

Figure 2:
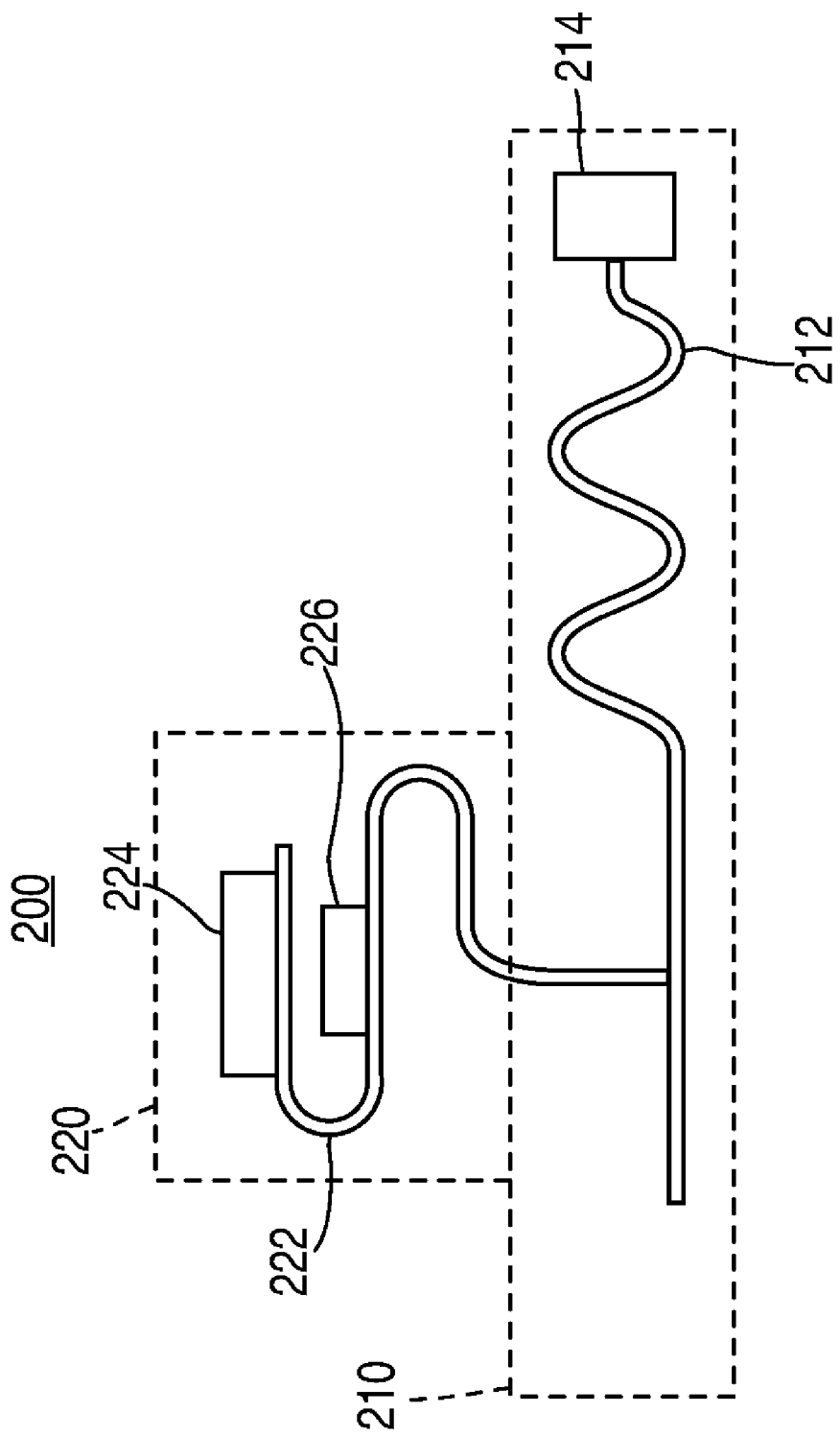
FIG. 2 is a simplified block diagram of a headset in accordance with an embodiment of the present invention.

FIG. 2 shows headset 200 in accordance with an embodiment of the invention. Headset 200 may correspond to an electronic headset (see e.g., headset 10 of FIG. 1) and may include primary housing 210 and earbud 220. Primary housing 210 may correspond to primary housing 11 and earbud 220 may correspond to earbud 12, for example. Earbud flexible circuit board 222 may be provided in earbud 220. Receiver 224 and processing circuitry 226 can be mounted on the earbud flexible circuit board 222. Earbud flexible circuit board 222 may be flexible such that it can fold upon itself or bend. Such flexibility may allow earbud flexible circuit board 222 to fit in smaller or less traditionally-shaped earbuds.

Primary housing 210 may be fixed to earbud 220. Primary housing 210 may include primary housing flexible circuit board 212 and microphone 214. Like earbud flexible circuit board 222, primary housing flexible circuit board 212 may be flexible such that it can fold upon itself or bend. Such flexibility may allow primary housing circuit board 212 to bend around other components in the primary housing (e.g., circuitry, antennas, or batteries) so as to conserve interior space inside the primary housing. For example, conserving interior space may result in more room to accommodate a larger battery. In another example, conserving interior space may result in a smaller primary housing. Earbud flexible circuit board 222 and microphone 214 can be electrically coupled to primary housing flexible circuit board 212. In some embodiments, such as the one shown in FIG. 2, earbud flexible circuit board 222 may extend into primary housing 210 such that it can couple with primary housing flexible circuit board 212. In other embodiments, primary housing flexible circuit board 212 may extend into earbud 220 such that it can couple with earbud flexible circuit board 222. It is to be understood that although primary housing flexible circuit board 212 and earbud flexible circuit board 222 are described as being flexible, one or both circuit boards may include both flexible and rigid portions. For example, each circuit board may include one or more rigid portions upon which electrical components (e.g., receiver 224, processing circuitry 226, or microphone 214) can be easily and stably mounted.

Figure 3A:
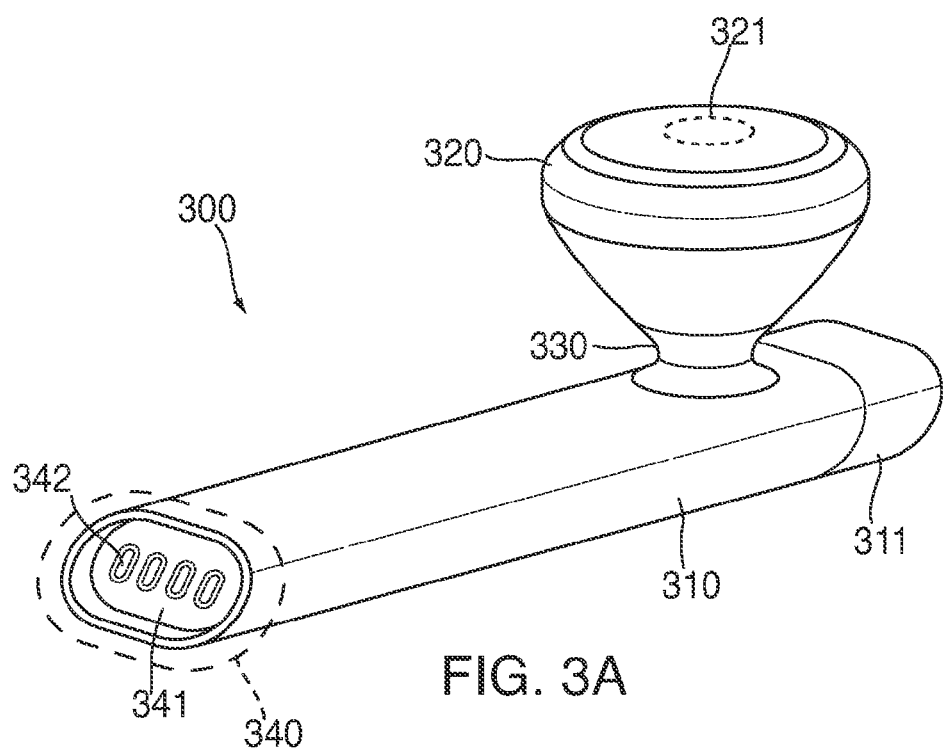
FIGS. 3A and 3B are illustrations of a headset in accordance with an embodiment of the present invention.
Figure 3B:
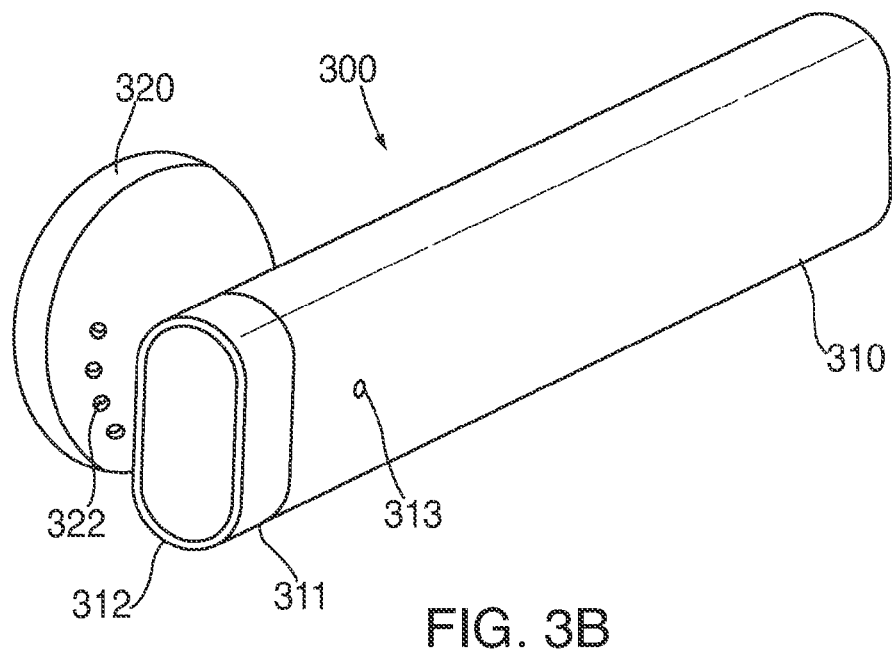

FIGS. 3A and 3B show perspective views of an illustrative headset in accordance with an embodiment of the present invention. Headset 300 can correspond to headset 10 of FIG. 1. For example, primary housing 310 can correspond to primary housing 11 and earbud 320 can correspond to earbud 12.

Headset 300 can include a housing that encloses the electronic and other elements of the headset. The housing can incorporate several pieces that are assembled using any suitable process (e.g., adhesive, screws, or press fit). In the example of FIGS. 3A and 3B, headset 300 can include earbud 320, neck 330, primary housing 310, antenna cap 311 and connector 340. Earbud 320 can include perforations (e.g., acoustic ports) 321 and 322 for allowing air to pass into and out of the earbud 320. Front port 321 can allow sound waves from a receiver located in earbud 320 to reach a user's ear and/or the outside environment. Side ports 322 can provide a path for acoustic pressure to vent to the outside environment. Earbud 320 can be attached to primary housing 310 by neck 330.

Attached to one end of primary housing 310 is antenna cap 311. Antenna cap 311 can have button 312 disposed at least partially therethrough. A user can interface with button 312 to control the headset. Primary housing 310 can include display 313 which can correspond to display system 18 of FIG. 1, for example. Located at the connector end of primary housing 310, connector 340 includes at least one port (not shown in FIG. 3A) for enabling a microphone inside housing 310 to receive acoustic signals (e.g., a user's voice), and at least one contact 342 for receiving power, data, or both from an external source.

Earbud 320, neck 330, primary housing 310, antenna cap 311 and connector 340 can be constructed from any suitable material including, for example, metal, plastic, silicone, rubber, foam, or combinations thereof. For example, earbud 320 can be formed from a plastic element surrounded by a silicone seal and primary housing 310 can be formed from aluminum. Earbud 320, neck 330, primary housing 310, antenna cap 311 and connector 340 can be manufactured using any suitable process (e.g., molding, casting or extrusion). In some embodiments, earbud 320, neck 330, primary housing 310, antenna cap 311 and connector 340 can be post processed to provide texture and other features on the inner or outer surfaces of the bodies. For example, a bead blast and anodization process can be used to apply a desired surface texture to primary housing 310.

Figure 4:
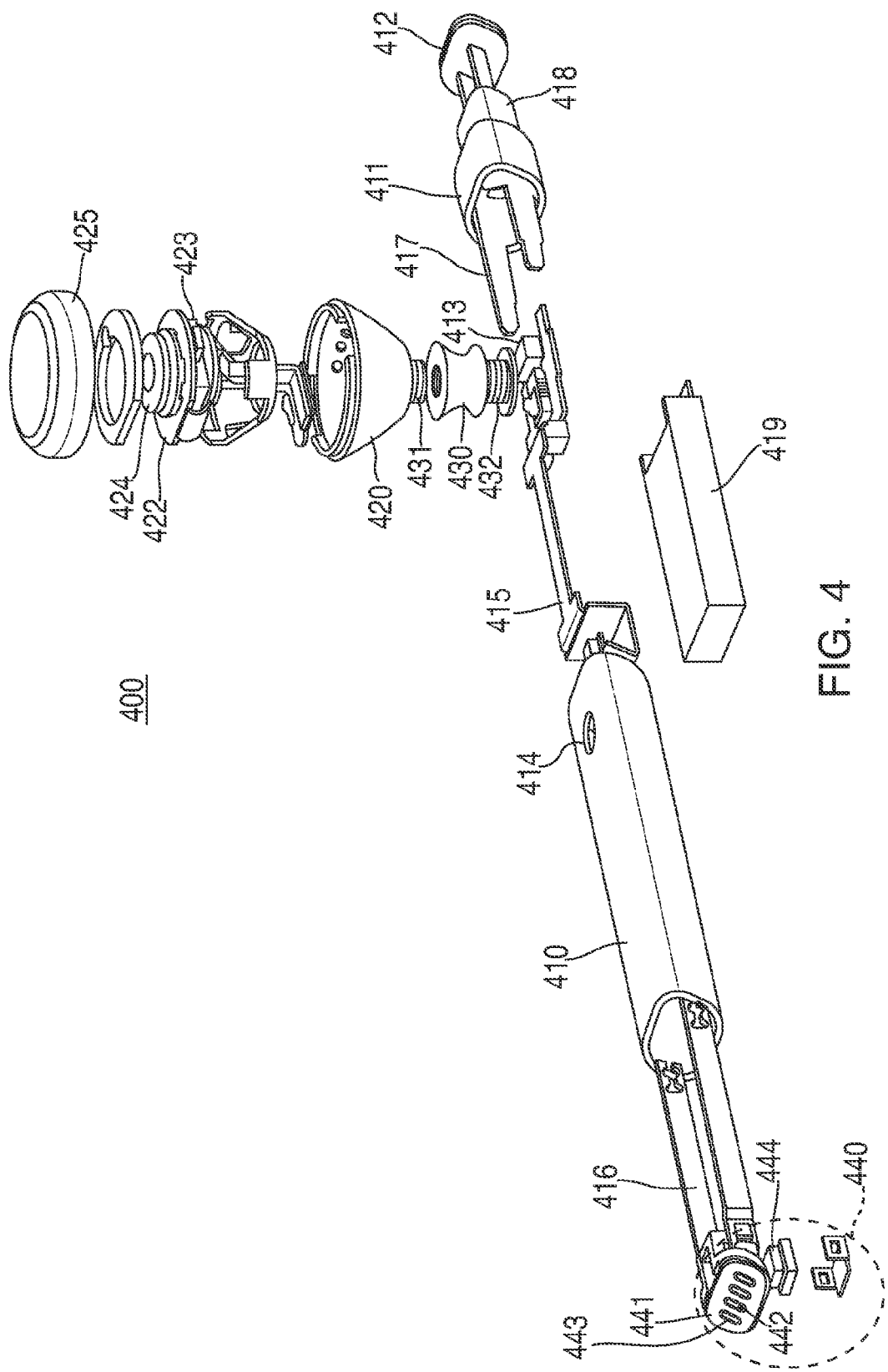
FIG. 4 is an exploded view of a headset in accordance with an embodiment of the present invention.

FIG. 4 is an exploded view of headset 400 in accordance with an embodiment of the present invention. Headset 400 can correspond to headset 10 of FIG. 1 or headset 300 of FIGS. 3A and 3B, for example. In one embodiment of the present invention, earbud housing 420 can contain earbud circuit board 422. Earbud circuit board 422 can, for example, correspond to earbud circuit board 222 of FIG. 2. Earbud circuit board 422 can be a flexible circuit board on which one or more of the following components are electrically and/or mechanically mounted: processor 423 (which can be used to control the functions of headset 400), receiver 424, and other circuitry and components. The flexible nature of earbud circuit board 422 can enable it to be folded onto itself, providing layers of circuitry that can be packed into earbud housing 420, thereby occupying space within earbud housing 420 that may otherwise be empty and unused. The flexible portions of earbud circuit board 422 can replace the need for separate wires connecting different circuit boards, which might cause a substantial increase in size because, for example, each wire might involve a pair of connectors. Additionally, the flexible nature of circuit board 422 can advantageously reduce the area or footprint required by circuit board 422. That is, compared to another circuit board having similar circuitry and components disposed thereon but in an unfolded layout, circuit board 422 can occupy less area. In addition, circuit board 422 further can reduce the footprint or size requirements of other components of headset 400, such as primary housing 410 and antenna cap 411, by incorporating within earbud housing 420 electronics and other components that traditionally are located elsewhere within a headset.

Earbud housing 420 can be coupled to primary housing 410 by neck 430. Neck 430 can be constructed with a double threaded screw insert to receive screw member 431 (associated with earbud housing 420) and screw member 432 (associated with primary housing 410). Neck 430 can connect earbud housing 420 and primary housing 410 in a manner that can reduce the likelihood of earbud housing 420 and primary housing 410 rotating independently of each other. That is, when headset 400 is in use and the user adjusts its position by, for example, pulling primary housing 410 down, the earbud housing 420 can rotate in conjunction with primary housing 410. However, in some embodiments, pulling primary housing 410 down may cause the housing to rotate with respect to earbud housing 420 so as to trigger a switch and signify a user input.

In addition to earbud circuit board 422, headset 400 also can include primary housing circuit board 415 on which additional electronic components 413 can be electrically and/or mechanically mounted. Primary housing circuit board 415 may, for example, correspond to primary housing circuit board 212 of FIG. 2. Primary housing circuit board 415 can be electrically coupled with the earbud circuit board by one or more wires, cables, flexible circuit boards, and the like. The arrangement of electronic components in both earbud circuit board 422 and primary housing circuit board 415 can advantageously reduce the size of headset 400.

A user can control the functions of headset 400 using button 412, which can be electrically coupled with primary housing circuit board 415. Button 412 can extend from antenna cap 411 such that it appears as a discrete user interface easily activated by a user. Button 412 can be configured to move in any suitable manner including, for example, bending with respect to primary housing 410, translating in and out of antenna cap 411, rotating around an axis passing through connector plate 441 and button 412, or any combination thereof.

In one embodiment, button 412 can include a switch such as a dome switch, which can be activated when a user depresses button 412. Button 412 can have a button guide structure. The button guide structure can have one or more guide channels to facilitate user actuation of the button with respect to the rest of headset 400. In one embodiment of the present invention, the guide channel(s) can be provided in the form of a hole through the button guide structure. The switch actuation member can have a stem that is supported and guided by the guide channel. When pressed by a user, the switch actuation member moves along the guide channel towards the switch. Raised structures (e.g., ribs) can be used to ensure that the switch actuation member reciprocates smoothly within the guide channel.

Button 412 and antenna cap 411 can be constructed from a dielectric material such as plastic. Antenna 418 can be formed by mounting an antenna resonating element within antenna cap 411 (e.g., along an inner surface of antenna cap 411) or on a portion of the button guide structure. Constructing button 412 and antenna cap 411 from a dielectric material can reduce or eliminate potential signal interference that can disrupt the proper operation of antenna 418. In addition, a dielectric button 412 can allow for smaller clearance between the antenna resonating element and conductive structures (e.g., primary housing circuit board 415) in headset 400.

Antenna 418 can be electrically coupled with primary housing circuit board 415 so that it can send and receive wireless (e.g., radio) signals. Antenna 418 can include any suitable antenna resonating element for communicating between headset 400 and an electronic device (e.g., a cellular telephone or a personal media device). The antenna resonating element can be formed from a flex circuit containing a strip of conductor. The flex circuit can be attached to the button guide structure using, e.g., adhesive. For example, the flex circuit can contain registration holes that mate with corresponding registration bosses on the button guide structure. One or more of the bosses can be heat staked to the flex circuit.

Details about the operation and design of an antenna and button system similar to antenna 418 and button 412 can be found, e.g., in U.S. patent application Ser. No. 11/651,094 entitled "Antenna and Button Assembly for Wireless Devices," which is incorporated herein.

Appendages 417 can be incorporated into antenna cap 411 in order to mount the antenna cap to headset 400. Appendages 417 can, for example, fasten to primary housing 410 or one or more brackets 416 which will be discussed in more detail below.

Battery pack 419 can be located within primary housing 410. Battery pack 419 can contain one or more suitable batteries including, for example, lithium ion, lithium ion polymer (Li-Poly), nickel metal hydride, or any other type of battery. Battery pack 419 can be electrically coupled with circuit board 415 for powering electronic components in headset 400. Additionally, circuitry that is typically packaged within standard battery packs (e.g., charging or fuse protection circuitry) can be moved to primary housing circuit board 415. Advantageously, the distribution of circuitry into earbud housing 420 and the layout of circuit board 415 can permit battery pack 419 to occupy a substantial portion of the internal space of primary housing 410. This can increase the energy storage capacity of headset 400 (e.g., allow headset 400 to operate for longer period of time in between charges) without increasing the size of primary housing 410 and headset 400.

Headset 400 can include connector 440 for enabling headset 400 to electrically connect to other devices. An opening or port can be included in connector 440 so that acoustic signals (e.g., speech from a user) can reach the microphone inside microphone boot 444. Connector 440 can, for example, correspond to connector 340 of FIGS. 3A and 3B, for example. The microphone can be electrically coupled with circuit board 415 in any suitable manner. Microphone boot 444 can be placed inside the end of primary housing 410 that is farthest from earbud housing 420. This end may be referred to herein as the microphone or connector end of headset 400, and is also the portion of headset 400 that is closest to the user's mouth when in use. The arrangement of the microphone boot 444 with respect to connector 440 and accompanying parts is discussed in more detail below in connection with the description accompanying FIGS. 8A-12, for example.

Connector 440 can include connector plate 441 in which contacts 442 and accompanying casing 443 can reside. As such, contacts 442 can facilitate the electrical coupling of headset 400 with another device. Accompanying casing 443 can be made from a non-conductive material (e.g., a polymeric material). Casing 443 can surround contacts 442 to prevent the contacts from electrically coupling with connector plate 441. Contacts 442 and casing 443 can be substantially flush with the surface of connector plate 441 so that the combination of the contacts, casing and plate creates a substantially flat surface for mating with other connectors. Connector plate 441 can be made of a ferromagnetic material so that it is biased to magnetic connectors. The design of connector plate 441, contacts 442 and casing 443 will be described in more detail below in connection with the discussion of FIGS. 13A-17B.

Headset 400 can include one or more brackets 416 to couple connector 440 with appendages 417 of antenna cap 411. Brackets 416 can prevent connector plate 441 and antenna cap 411 from moving axially away from each other or separating from primary housing 410. Alternatively, connector plate 441 and antenna cap 411 can be coupled to one or more brackets that are secured to the inner surface of primary housing 410.

As a matter of design choice, a seam can be included in between the peripheral surface of connector plate 441 and the inner surface of primary housing 410. That is, in addition to the predefined port for providing an acoustic pathway between the microphone and the outside environment, gaps can exist. These gaps can advantageously enable the microphone to receive acoustic signals in the event the predefined acoustic pathway is blocked (e.g., by a foreign object such as dirt). In other embodiments, an adhesive may be applied to provide a substantially airtight seal between connector plate 441 and primary housing 410. In yet another embodiment, a gasket may be used to provide a seal.

Figure 5:
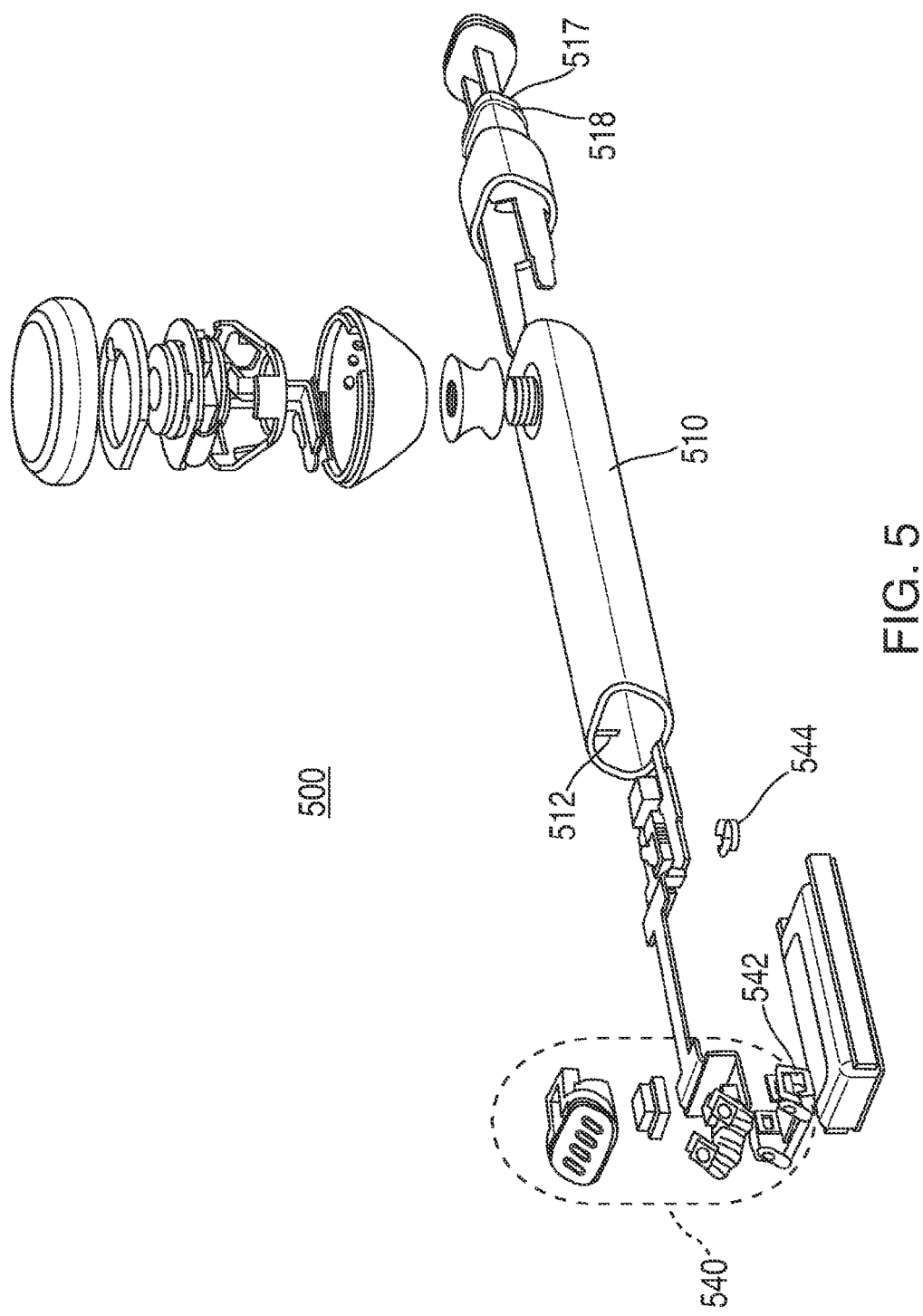
FIG. 5 is an exploded view of a headset in accordance with another embodiment of the present invention.

FIG. 5 shows a view of headset 500 in accordance with another embodiment of the present invention. Headset 500 can be similar to headset 400, but with some substantial differences between the two. For example, headset 500 can use a different attachment technique to couple connector 540 to primary housing 510. Connector 540 can include tabs 542 which can be used to couple with features (e.g., wall 512) on an interior surface of primary housing 510. Such a method might be advantageous to using the brackets 416 in headset 400. For example, the tabs 542 can attach to the near end of primary housing 510 which might provide connector 540 with higher structural integrity than, for example, the method of using brackets to attach to a structure (e.g., antenna cap) on the other end of the primary housing. Headset 500 can also include light diffuser 544 which can be used in conjunction with a visual indicator system. Additionally, headset 500 can include antenna 518 which can wrap around button guide 517 in some embodiments.

The fundamental basics of the Bluetooth protocol are well known in the art, and discussed briefly below. For a more detailed discussion, please see Bluetooth Specification Version 2.0+EDR, Vol. 0, Nov. 4, 2004, which is hereby incorporated by reference in its entirety. Bluetooth wireless technology is based on an international, open standard for allowing intelligent devices to communicate with each other through wireless, low power, short-range communications. This technology allows any sort of electronic equipment, from computers and cell phones to keyboards and headphones, to make its own connections, without wires or any direct action from a user. Bluetooth is incorporated into numerous commercial products including laptop computers, PDAs, cell phones and printers, and is likely to be used in future products.

Bluetooth can be referred to as a frequency hopping spread spectrum (FHSS) radio system that operates in the 2.4 GHz unlicensed band. Bluetooth transmissions change frequencies based on a sequence which is known to both the transmitter and the receiver. According to one known standard, Bluetooth transmissions use 79 different frequencies ranging from 2.404 GHz to 2.480 GHz. Bluetooth's low power transmissions allow a typical range of about 10 meters or roughly 30-40 feet. This range can vary from about 1 meter to 100 meters depending on the amount of power used by the device for Bluetooth transmissions.

Bluetooth devices connect to each other to form networks known as piconets. A piconet includes two or more devices which are synchronized to a common clock signal and hopping sequence. Thus, for any device to connect to a given piconet, that device may need to have the same clock signal and hopping sequence. The synchronized clock and hopping sequence can be derived using the clock signal of one of the devices on the piconet. This device is often referred to as the "master" device while all other devices on the piconet are referred to as "slave" devices. Each piconet can include one master device and up to seven or more slave devices. Moreover, Bluetooth devices can belong to more than one piconet. The term "scatternet" is used to define Bluetooth networks which are made up of multiple, overlapping piconets. In the case where one Bluetooth device is on two or more piconets, all of the devices are on a single scatternet. Devices from one of the piconets can communicate with devices from another piconet by using the shared device to relay the signals.

When two Bluetooth devices initially connect, they first share some general information (e.g., device name, device type) with each other. In order to enhance the connection, the devices can establish a trusted relationship by using a secret passkey. This passkey is typically provided by a user or stored on memory in a device. According to a known Bluetooth standard, the process of establishing this trusted relationship is called pairing. Once two devices are paired, they typically share information and accept instructions from one another.

Bluetooth devices can operate with a maximum data throughput of approximately 2.1 Mbit/s (Megabits-per-second), but it is understood that such limitations change as technology advances, and that embodiments of the present invention may operate at other rates. This maximum throughput is shared among all devices on a piconet, meaning that if more than one slave device is communicating with the master, the sum of all communications is less than the maximum data throughput.

Figure 6:
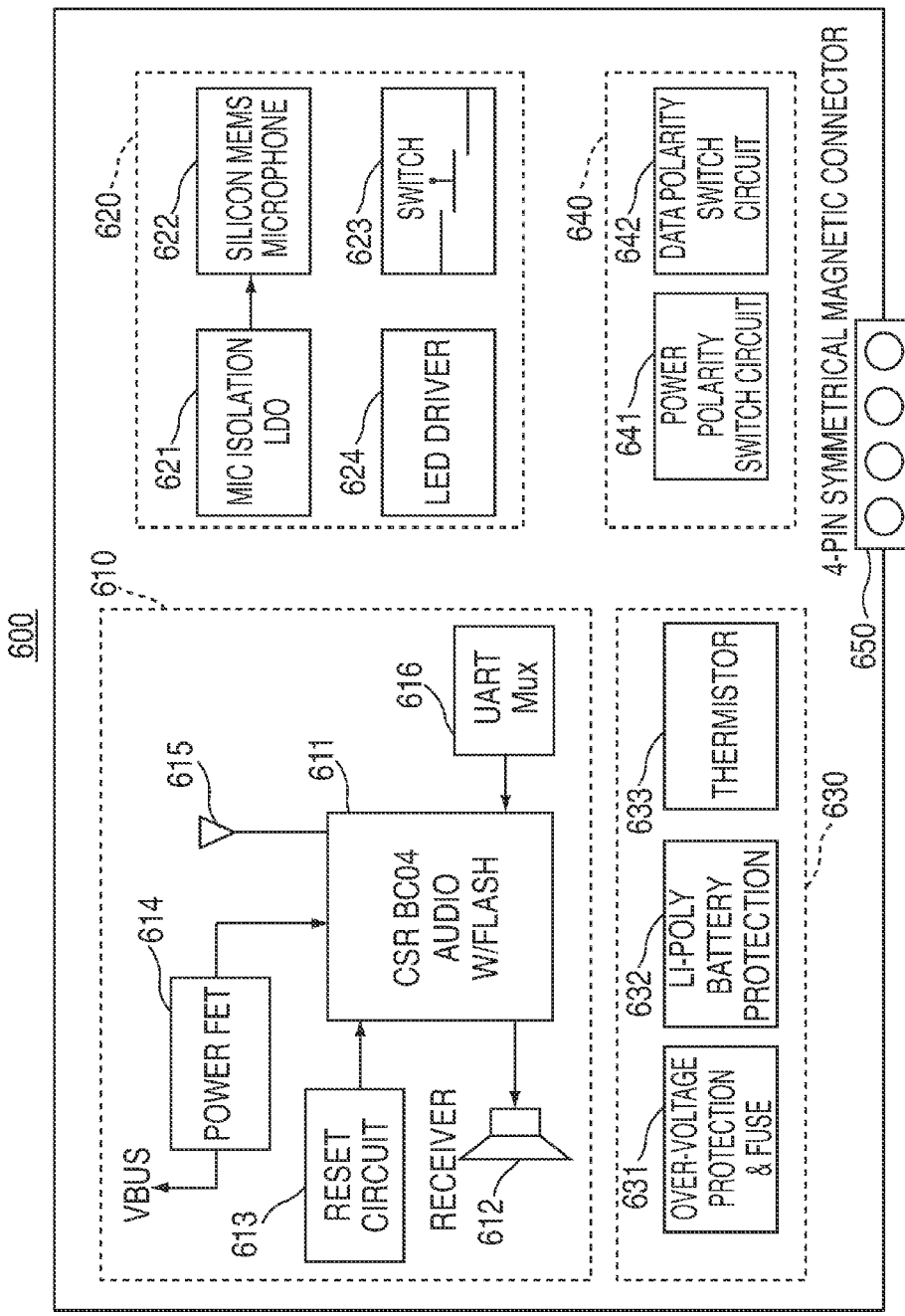
FIG. 6 is a simplified block diagram of the electrical system of a headset in accordance with an embodiment of the present invention.

FIG. 6 shows a simplified block diagram of exemplary electronic system 600 of a headset in accordance with an embodiment of the present invention. The system of 600 can be implemented in, for example, headset 10 of FIG. 1 or headset 300 of FIGS. 3A and 3B. System 600 can include processor circuitry 610, interface circuitry 620, power distribution circuitry 630, switching circuitry 640 and 4-pin symmetrical magnetic connector 655.

Processor circuitry 610 can include processor 611 and auxiliary circuitry that operates in connection with processor 611. Processor 611 can coordinate all of the operations in system 600, including, for example, Bluetooth transmissions, battery charging and processing (e.g., encoding and decoding) of acoustic signals. Processor 611 can drive receiver 612 to provide acoustic signals that may be heard by a user. Reset circuit 613 can detect when system 600 is connected to another device and subsequently instruct processor 611 to reset. Power FET 614 can be used with the power supply circuitry inside processor 611. Antenna 615 can be used to send wireless signals to and receive wireless signals from another device (e.g., a phone or portable media device). UART multiplexer 616 can be electrically coupled with processor 611 and can route data signals to different parts of processor 611. This routing can reduce unwanted effects, such as inductance, in unused data lines.

Interface circuitry 620 can include a microphone isolation LDO 621, a micro-electro-mechanical (MEMs) microphone 622, LED driver 624 and switch 623. Microphone isolation LDO 621 can be electrically coupled with MEMs microphone 622. Microphone isolation techniques and MEMs microphones are well known, and a person of ordinary skill in the art will appreciate that these elements can be replaced by other equivalent microphone configurations without deviating from the spirit of the present invention. LED driver 624 can be configured to drive a LED display unit based on one or more outputs of processor 611. Details about the design and function of circuitry similar to LED driver 624 can be found in U.S. patent application Ser. No. 60/878,852 entitled "Systems and Methods for Compact Multi-State Switch Networks," which is incorporated herein. Switch 623 can represent the electrical behavior of button 312 of FIG. 3B. A user can interface with this switch to input commands to the headset. For example, a user can depress switch 623 to initiate a telephone call, terminate a call, or both. In one embodiment, switch 623 can be a single-pole, single-throw switch with a spring to bias it to an open position.

Power distribution circuitry 630 can include over-voltage protection and fuse 631, battery protection circuitry 632 and thermistor 633. Over-voltage protection and fuse 631 can protect system 600 in the event that an unsafe amount of voltage is applied to one or more inputs. The fuse in the protection circuitry can be an over-current protection device which disconnects the inputs of the headset if an over-current condition is detected. Battery protection circuitry 632 can include circuitry to prevent the malfunction of a battery (e.g., a li-poly battery) which could result in a dangerous overheating situation. Battery protection circuitry 632, in contrast to conventional headsets which has such circuitry integrated into the battery pack, can be separated from the battery pack and located elsewhere within a headset according to the invention. Thermistor 633 can be located in the proximity of a battery (see e.g., battery pack 419 of FIG. 4) and may change its resistance based on the battery's temperature. One or more inputs of processor 611 can be electrically coupled with thermistor 633 to monitor the temperature of the battery. Processor 611 can be programmed to charge the battery differently depending on the detected battery temperature. For example, processor 611 may charge the battery at a faster rate when the monitored battery temperature is low than when the temperature is high. By regulating the charging in this manner, the time required to completely charge a battery can be decreased without damaging the battery.

Symmetrical magnetic connector 655 can allow system 600 to connect to other devices and systems for communicating data or transmitting power. Connector 655 represents the electrical behavior of connector 16 of FIG. 1, for example.

Switching circuitry 640 can enable connector 655 to connect and communicate with many different types of devices and in many interface orientations. Switching circuitry 640 can include power polarity switch circuit 641 and data polarity switch circuit 642. The two circuits can, for example, determine the type of communication interface being used and route the corresponding data and/or power lines to the correct pathways (e.g. internal electrical traces) for the detected interface. The two circuits can also determine the interface orientation of a connection with another device, for example, and route the corresponding data and/or power lines to the correct pathways (e.g., internal electrical traces) for the detected orientation. A detailed description of the design and function of exemplary circuits similar to switch circuits 641 and 642 can be found in U.S. patent application Ser. No. 11/650,130 entitled "Systems and Methods for Determining the Configuration of Electronic Connections," which is incorporated herein.

FIGS. 7A and 7B show side and perspective views of earbud circuit board 720 in a folded configuration in accordance with an embodiment of the present invention. Earbud circuit board 720 may, for example, correspond to earbud circuit board 222 of FIG. 2. The folded configuration may correspond to the configuration of circuit board 720 when installed within a headset, or more particularly, the earbud of the headset, as shown in FIG. 7C. Top rigid section 727 can be folded over middle rigid section 725 so that both sections can fit in the earbud of a headset. Processor 722, receiver 724 and various other electronic components 726 may be mounted to earbud circuit board 720. Electronic components 726 can include resistors, capacitors, transistors, amplifiers and other types of both passive and active electronic components, for example. It is to be understood that the term electronic components, as used herein, does not include interconnect devices (e.g., wires, traces, connectors, etc.). Earbud circuit board 720 can further include rigid section 723 and connector 728 mounted thereon. Connector 728 can be used to electrically couple earbud circuit board 720 with a circuit board in a headset's primary housing (see e.g., circuit board 415 or circuit board 711).

Referring now to FIG. 7C, which shows earbud circuit board 720 and primary housing circuit board 711 installed in a possible configuration within headset 700 in accordance with an embodiment of the present invention. Circuit board 720 can be folded in a configuration similar to that of FIGS. 7A and 7B and inserted into earbud 714. Primary housing circuit board 711 can include a combination of rigid and flexible sections that are similar, in composition but not necessarily shape, to the rigid and flexible sections of circuit board 720. Circuit board 711 can be folded to provide a cavity 712 for a battery (see e.g., battery pack 419 of FIG. 4). Circuit board 711 can include connector 718 which may connect to connector 728 of earbud circuit board 720. During installation, circuit board 711 can be inserted through one of the open ends of primary housing 710. Connector lead 721 can be fed through headset neck 713 so connector 728 can mate with connector 718 when circuit board 711 has been inserted into primary housing 710.

This distribution of electronics, where processor 722 and other circuitry (e.g., receiver 724 and other electronic components 726) are located inside earbud 714, advantageously allows for a generally smaller and more comfortable headset. Although the discussion above is related to an embodiment in which a certain distribution of electronic components is used, other distributions can be used without deviating from the spirit of the present invention. For example, a battery can be placed inside the earbud and a processor can be placed in the primary housing.

FIG. 8A includes a side view of headset 800 in accordance with an embodiment of the present invention. Connector 840 can include primary housing 810, connector plate 841, contacts 843, casing 844 and microphone port 850. Connector plate 841 can include recessed groove 842 which runs around the perimeter of connector plate 841. Groove 842 can also be referred to as a recessed step in connector plate 841. At the top of connector plate 841, a microphone port 850 can be located in groove 842.

There are many benefits associated with placing microphone port 850 along the edge of connector plate 841. By including the microphone port near the connector plate, the microphone can be embedded in the connector which saves space inside the headset housing. The space that is saved can be used to incorporate other functionality or decrease the overall size of the headset. Moreover, locating the microphone port in the groove around the edge of the connector can hide it from view which increases the overall aesthetic appearance of the headset FIG. 8B shows a detailed view of the microphone port area of a connector in accordance with an embodiment of the present invention. The dimensions of port 850 can include, for example, a width 890 of approximately 2.5 millimeters and a height 892 of approximately 0.3 millimeters. These dimensions are merely illustrative and it is understood that other dimensions may be practiced.

Figure 9:
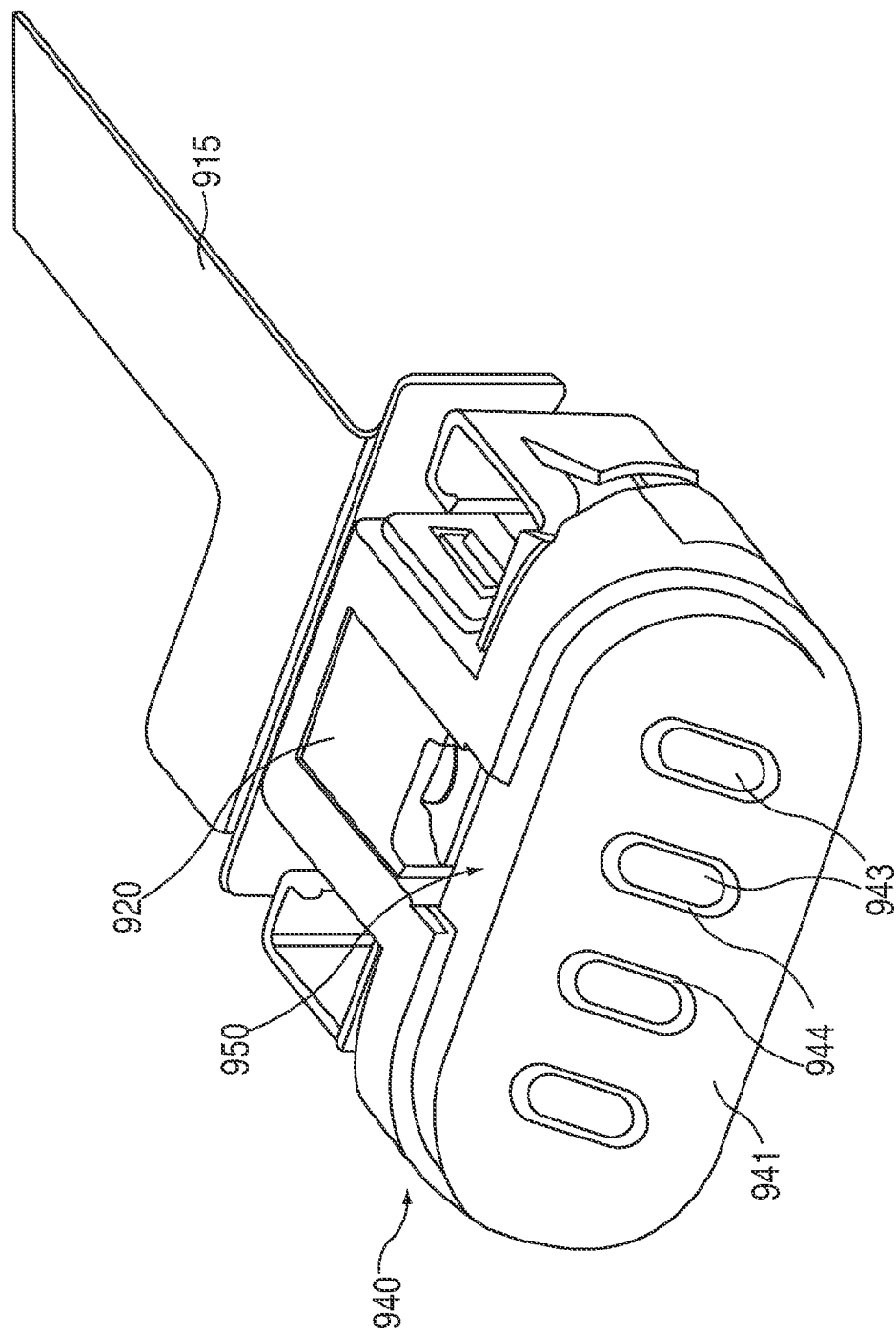
FIG. 9 is an illustration of a connector in accordance with an embodiment of the present invention.

FIG. 9 shows a view of connector 940 with the primary housing removed in accordance with an embodiment of the present invention. Connector 940 can, for example, correspond to connector 16 of FIG. 1, connector 340 of FIGS. 3A and 3B, or connector 440 of FIG. 4. Connector 940 can be mounted up primary housing circuit board 915, for example. Connector 940 can include connector plate 941, contacts 943 and accompanying casing 944 to prevent the contacts from electrically coupling with the connector plate. Microphone port 950 can be included in the top of connector plate 941 to allow sound to reach microphone boot 920. Microphone boot 920 and a microphone contained therein can be located behind connector plate 941. The microphone can be contained within microphone boot 920 to, for example, protect the microphone from damage and control the flow of air into the microphone.

Figure 10:
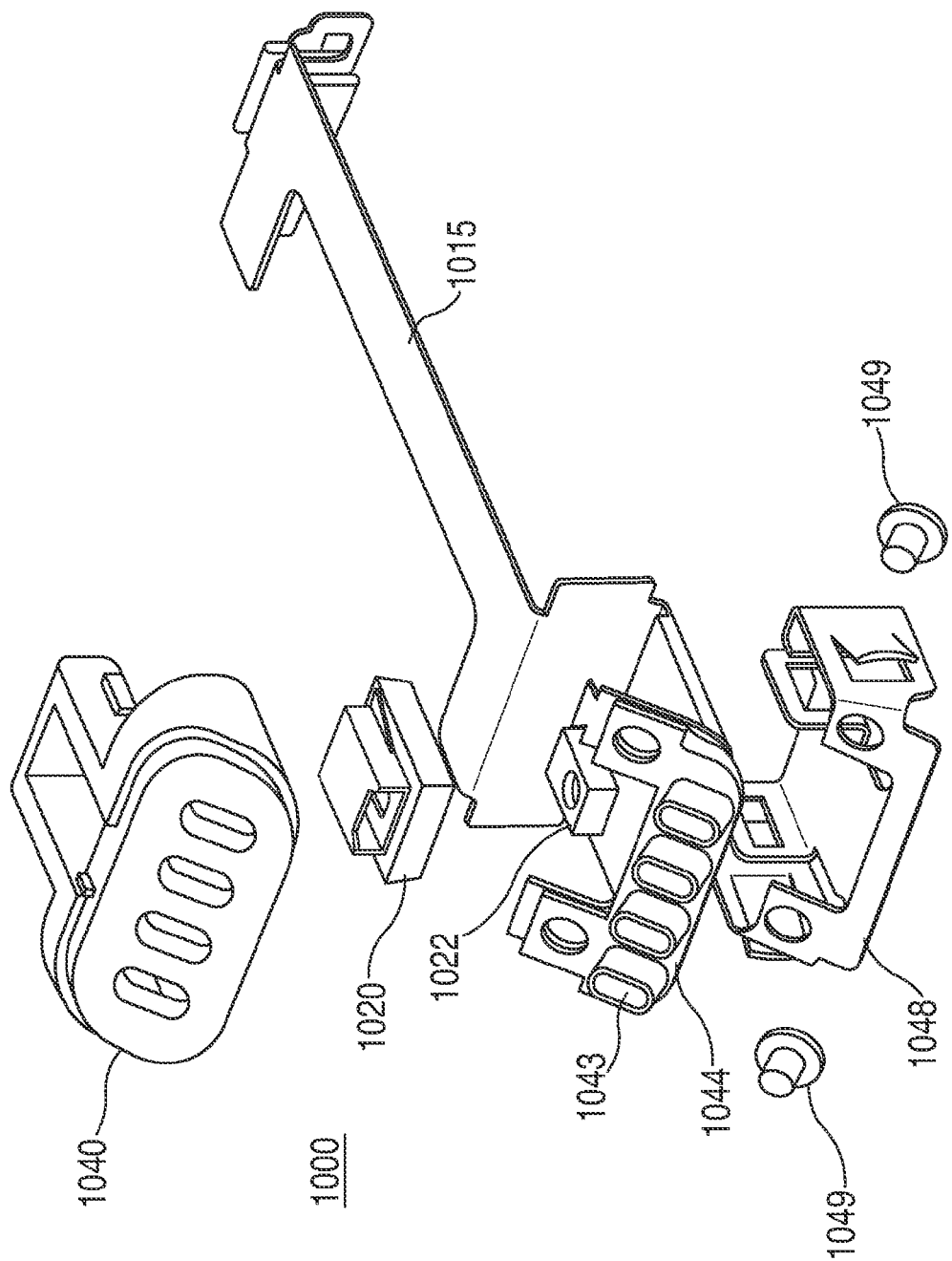
FIG. 10 is an exploded view of a connector in accordance with an embodiment of the present invention.

FIG. 10 shows an exploded view of connector 940 of FIG. 9 which can include, for example, connector plate 1040, microphone boot 1020, microphone 1022, contacts 1043, casing 1044, bracket 1048 and screws 1049 in accordance with an embodiment of the present invention. Microphone 1022 can be a MEMs microphone and can be electrically coupled with circuit board 1015. Circuit board 1015 is similar to primary housing circuit board 415 of FIG. 4. Microphone boot 1020 can mount over microphone 1022. Microphone boot 1020 can, for example, be made of silicon so that it can seal with surrounding parts when connector 1000 is assembled. Contacts 1043 can be included in casing 1044. Casing 1044 can be made of a non-conductive material (e.g., polymeric) so that contacts can not be electrically coupled with connector plate 1040. Casing 1044 can be mounted onto circuit board 1015 and include conductive elements (see e.g., shank 1507 and contact segment 1508 of FIG. 15B) which can electrically couple contacts 1043 with circuit board 1015. Bracket 1048 can couple with connector plate 1040 in order to hold connector 1000 together. Upward pressure from bracket 1048 can compress microphone boot in order to create an acoustic (e.g., substantially air-tight) seal for the passage of air into and out of microphone 1022. Circuit board 1015, casing 1044 and bracket 1048 can include one or more apertures for mounting to connector plate 1040. Screws 1049 can be inserted through these apertures and screwed into threaded cavities (see e.g., cavities 6046) on the back of connector plate 1040.

Figure 11:
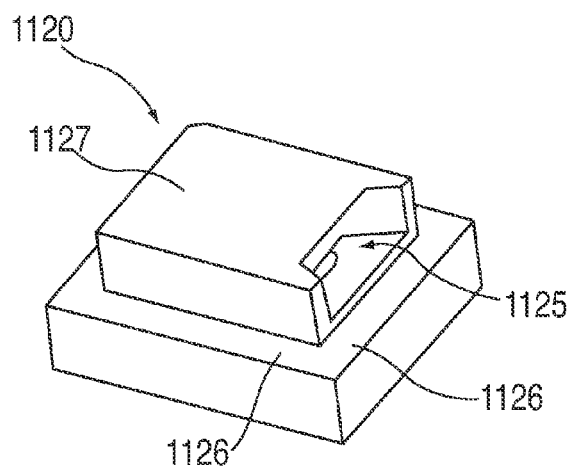
FIG. 11 is an illustration of a microphone boot in accordance with an embodiment of the present invention.

FIG. 11 shows a view of microphone boot 1120 which can include input aperture 1125 in accordance with an embodiment of the present invention. Microphone boot 1120 can, for example, correspond to microphone boot 1020 of FIG. 10. Air that flows into a headset by going around microphone boot 1120 can cause a noticeable loss in the quality of the audio signals picked up by a microphone in the boot. Therefore, microphone boot 1120 can include sealing surface 1126 to prevent air from leaking through any seams along the edge of the microphone boot. Sealing surface 1126 can be a horizontal surface of boot 1120 that extends to the perimeter of the boot's footprint. Sealing seams in this manner can direct the flow of air into aperture 1125 which can result in higher sound quality being received by the microphone.

Traditionally, the roof of a microphone boot creates a seal with the surfaces of surrounding parts. This can require a thicker roof which is structurally robust enough to support the pressure required to make an adequate seal. Because boot 1120 uses horizontal sealing surface 1126 (instead of roof 1127) to seal with surrounding parts, roof 1127 does not need to be very thick. This reduced thickness saves space in a housing and can result in a generally smaller or thinner headset.

Figure 12:
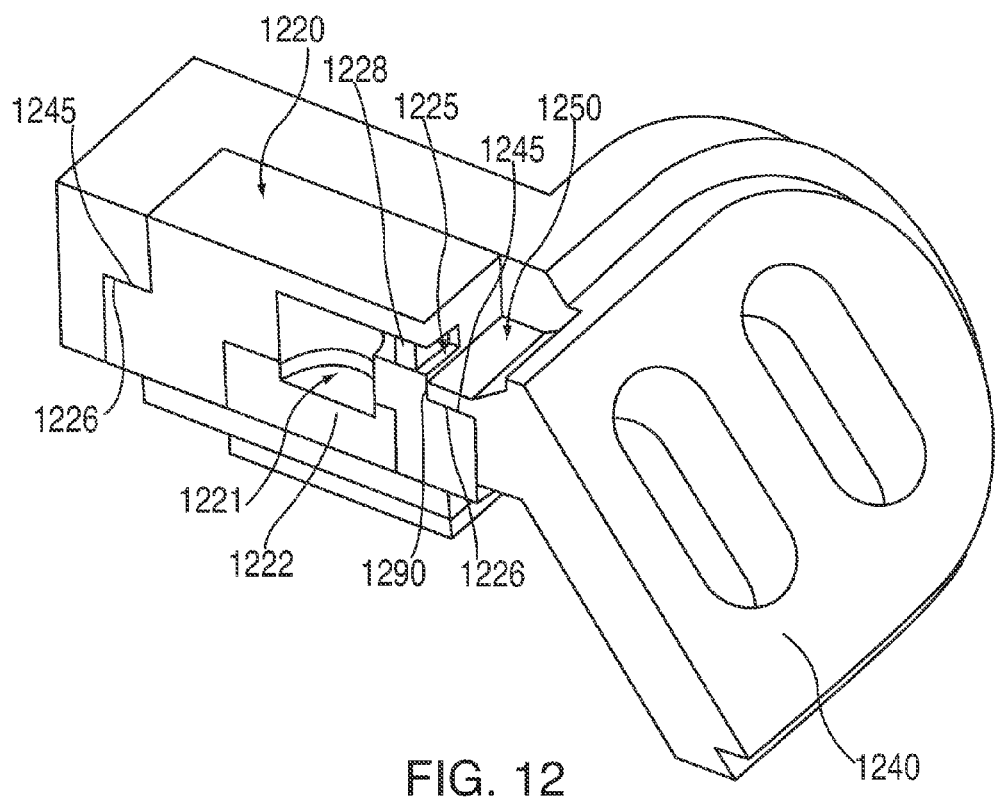
FIG. 12 is a cross-sectional view of a connector in accordance with an embodiment of the present invention.

FIG. 12 shows a perspective, cross-sectional view of connector plate 1240 which includes microphone boot 1220 and microphone 1222 in accordance with an embodiment of the present invention. Connector plate 1240, boot 1220 and microphone 1222 can, respectively, correspond to connector plate 1040, booth 1020 and microphone 1022 of FIG. 10, for example. The components shown in FIG. 12 can fit together so that air can pass through microphone port 1250, into boot aperture 1225 and reach microphone input 1221. Microphone port 1250 may, for example, be a cut-out in the recessed step of connector plate 1240. Because of other elements in the connector assembly (e.g., circuit board 1015 and bracket 1048), microphone 1222 and microphone boot 1220 can be pushed up against connector plate 1240 when installed in a headset. The pressure from this force can cause surface 1226 to form a seal with surface 1245 of connector plate 1240. This seal can prevent air from passing through seam 1290 in between connector plate 1240 and microphone boot 1220.

In some embodiments, porous plug 1228 may be provided in boot aperture 1225. Plug 1228 may be, for example, made from a porous foam (e.g., sintered polyethylene or super high-density polyethylene). Plug 1228 can help filter out high-frequency noises such as those generated by wind blowing into microphone port 1250. The acoustical performance of plug 1228 can be a factor of its porosity which can be controlled by manufacturing. For example, plug 1228 can be manufactured by melting particles of polyethylene together. The porosity of the resulting plug can be a function of how long the particles are melted, what temperature is used to melt the particles, and the particles size. In some embodiments, it may be advantageous to only use polyethylene particles of a certain size when forming plug 1228. For example, particles with a diameter between 177 microns and 250 microns may be melted to form plug 1228.

Figure 13B:
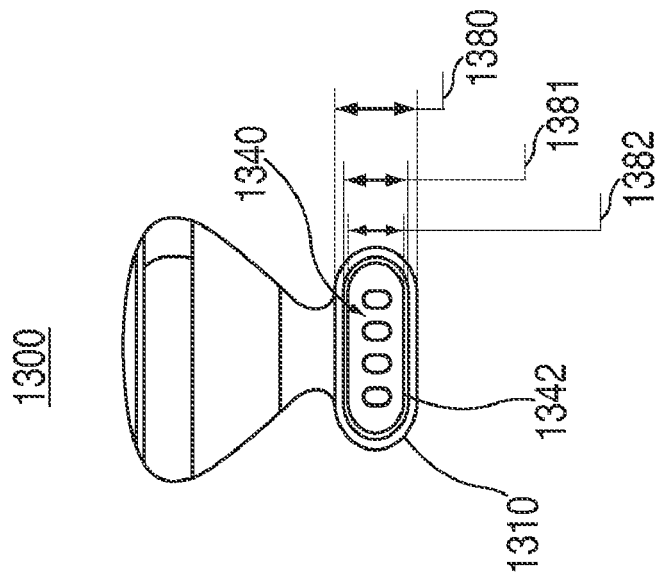
Figure 13A:
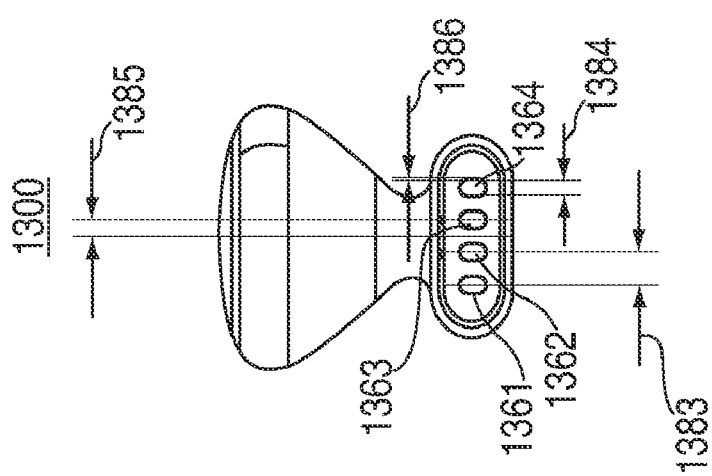

FIGS. 13A and 13B show views of the connector of headset 1300 in accordance with an embodiment of the present invention. Four contacts 1361, 1362, 1363 and 1364 can be integrated into the connector. The contacts can be of a substantially flat shape so that they are flush with the face of connector plate 1340. The contacts can, for example, be of an oval shape. The outer contacts 1361 and 1364 can be configured for coupling to either a power supply line or a ground line. The remaining inner contacts 1362 and 1363 can be configured for receiving and transmitting data.

Connector plate 1340 can be located within primary housing 1310 and can include recessed groove 1342. Height 1380 of primary housing 1310 can be approximately 5 millimeters or can be from a range between 4.7 and 5.3 millimeters. Height 1381 of the interior cavity of primary housing 1310 can be approximately 4 millimeters or can be from a range between 3.7 and 4.3 millimeters. Height 1382 of the raised face of connector plate 1340 can be approximately 3.3 millimeters or can be from a range between 3.0 and 3.6 millimeters. Heights 1380, 1381 and 1382 can be advantageous because they can provide a headset having a small form-factor yet large enough to adequately couple with a complementary connector. Heights 1381 and 1382 can also provide an adequate groove for sound from a user's voice to reach a microphone embedded in connector plate 1340 (see e.g., microphone 17 of FIG. 1). It is understood that these dimensions are merely illustrative. It is also understood that connector plate 1340 and the aperture in primary housing 1310 are angled with respect to the axis of primary housing 1310, and heights 1380, 1381 and 1382 reference the orthogonal heights of the corresponding elements.

Connector plate 1340 can include four contacts 1361, 1362, 1363 and 1364 which can be separated by pitch 1383, which can be approximately 2 millimeters or from a range between 1.75 and 2.25 millimeters. Pitch can be defined as the distance from the centerline of a contact to the centerline of the nearest contact. Pitch 1383 can be advantageous because it can allow contacts on complementary connectors to be sufficiently spaced apart such that magnetic components can be provided between the contacts.

Each contact can have a width 1384, which can be approximately 0.7 millimeters or from a range between 0.5 and 0.9 millimeters. The ring of exposed casing can have a width 1386 of approximately 0.2 millimeters or can be from a range between 0.12 and 0.3 millimeters. All of the rings-of exposed casing can have the same width (e.g., width 1386). Width 1386 can be advantageous because it is large enough to prevent contacts 1361, 1362, 1363 and 1364 from shorting with connector plate 1340, but small enough to not impact the size of connector plate 1340. The contacts can be arranged on the face of connector plate 1340 so that they are symmetrical about the centerline of headset 1300. Dimension 1385, which represents the distance from the centerline of each contact to the centerline of the headset, can be approximately 1 millimeter. The dimensions of contacts 1361-1364 can be advantageous because the dimensions can provide a sufficient surface for coupling with a corresponding connector while maintaining a small form-factor headset. For example, if the contacts were much larger, the size of housing 1310 may need to increase.

FIG. 13C includes a side view of headset 1300 in accordance with an embodiment of the present invention. The angle between the face of connector plate 1340 and the axis of primary housing 1310 can be represented by angle 1387, which can be approximately 55 degrees or from a range between 10 and 80 degrees. Angle 1387 can be advantageous because it can provide a suitable angle for mating headset 1300 with a corresponding connector. Angle 1387 may also provide an appropriate angle for reflecting sound from a user's mouth to the microphone of headset 1300 (see e.g., microphone 17 of FIG. 1). Angle 1387 can also be provided to block outside sounds from the microphone of headset 1300.

As measured along the surface of connector plate 1340, the height 1388 of each contact can be approximately 1.5 millimeters. Height 1388 can be advantageous because it provides a substantial surface area for headset 1300 to couple with corresponding headsets but does not necessarily cause an increase in the size of housing 1310.

The connector plate 1340 can be recessed in primary housing 1310 by a depth 1389 of approximately 0.25 to 0.3 millimeters. This depth can be determined by measuring the distance between the face of connector plate 1340 and a plane defined by the end of primary housing 1310 (e.g., a plane including three points on the connector end of primary housing 1310). Depth 1389 can be advantageous because it can provide a sufficient depth to strengthen the mechanical link between headset 1300 and a corresponding connector, but not be of such a large depth that it becomes difficult to align the headset with such a connector.

FIG. 13D includes a top view of headset 1300 in accordance with an embodiment of the present invention. Width 1390 of primary housing 1310 can be approximately 12.3 millimeters or can be from a range between 10 and 14 millimeters. Width 1391 of the interior cavity of primary housing 1310 can be approximately 11.1 millimeters or can be from a range between 7 and 13 millimeters. Width 1392 of the raised face of connector plate 1340 can be approximately 10. 3 millimeters or can be from a range between 5 and 11 millimeters. Widths 1390, 1391, and 1392 can be advantageous because they can provide a large enough area for headset 1300 to securely couple with a complementary connector, while not being so large so as to prevent headset 1300 from having a small form-factor. The dimensions given above apply to the embodiments shown in 13A, 13B, 13C and 13D and it is understood that other dimensions can be used without deviating from the scope of the present invention.

Figure 14:
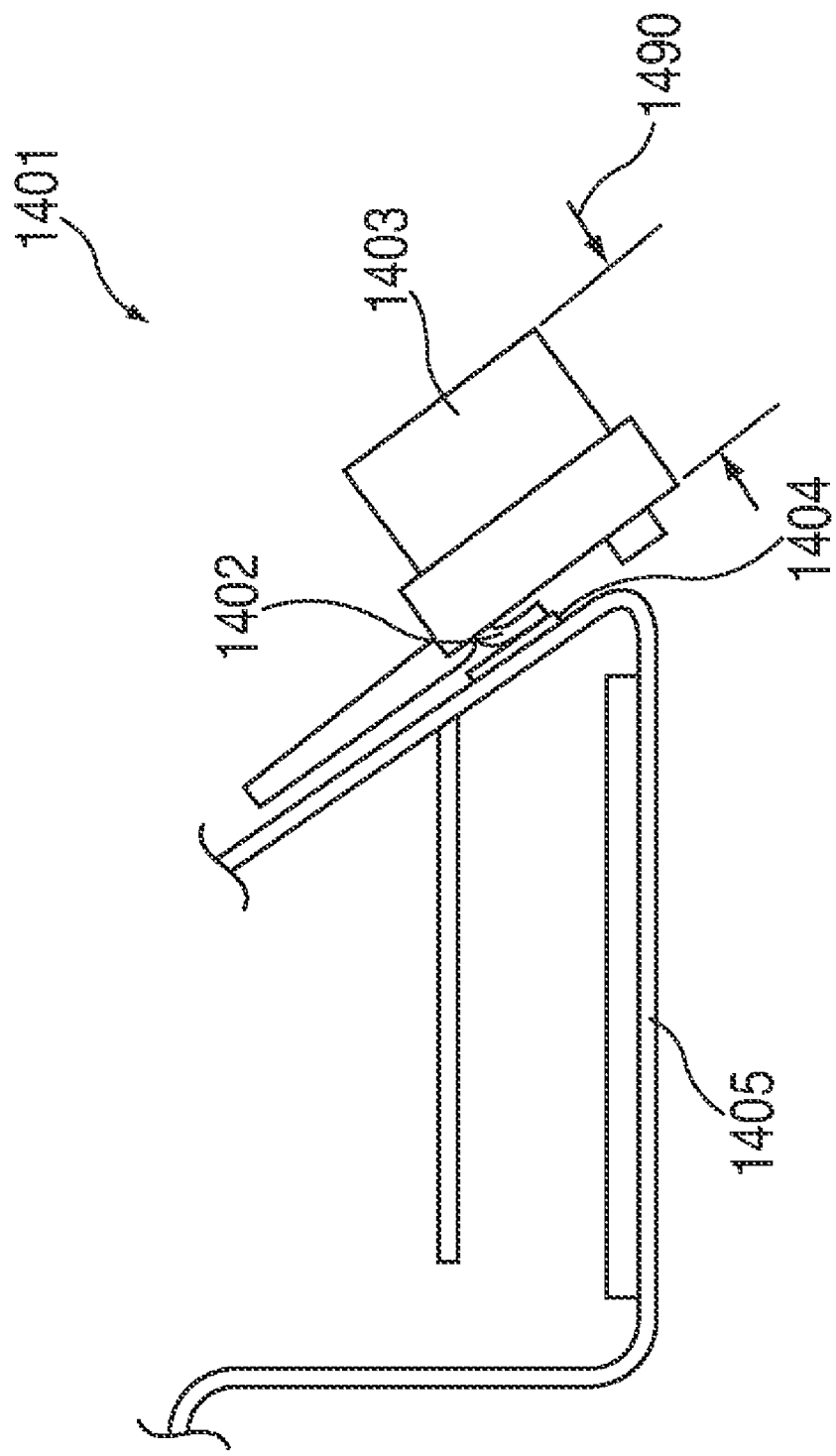
FIG. 14 is a cross-sectional view of an electrical contact assembly coupled to a circuit board in accordance with an embodiment of the present invention.

FIG. 14 illustrates an assembly of electrical contacts for connector 340 in accordance with an embodiment of the present invention. Assembly 1401 can include plurality of electrical contacts 1402 disposed in non-conductive (e.g., polymeric) casing 1403. Casing 1403 can include protruding members such that each protruding member can extend through a cavity in a connector plate. In FIG. 10, for example, casing 1044 includes four protruding members and connector plate 1040 includes four cavities (or apertures). When casing 1044 is coupled with connector plate 1040, the casing's protruding members will fill those cavities. Accordingly, each protruding member can be referred to as a protruding cavity member as well. Electrical contacts 1402 can extend through at least a portion of depth 1490. In an assembled headset, each electrical contact 1402 can have a portion disposed in electrical contact with electrical contact 1404 of circuit board 1405, which can be flexible or rigid.

Figure 15B:
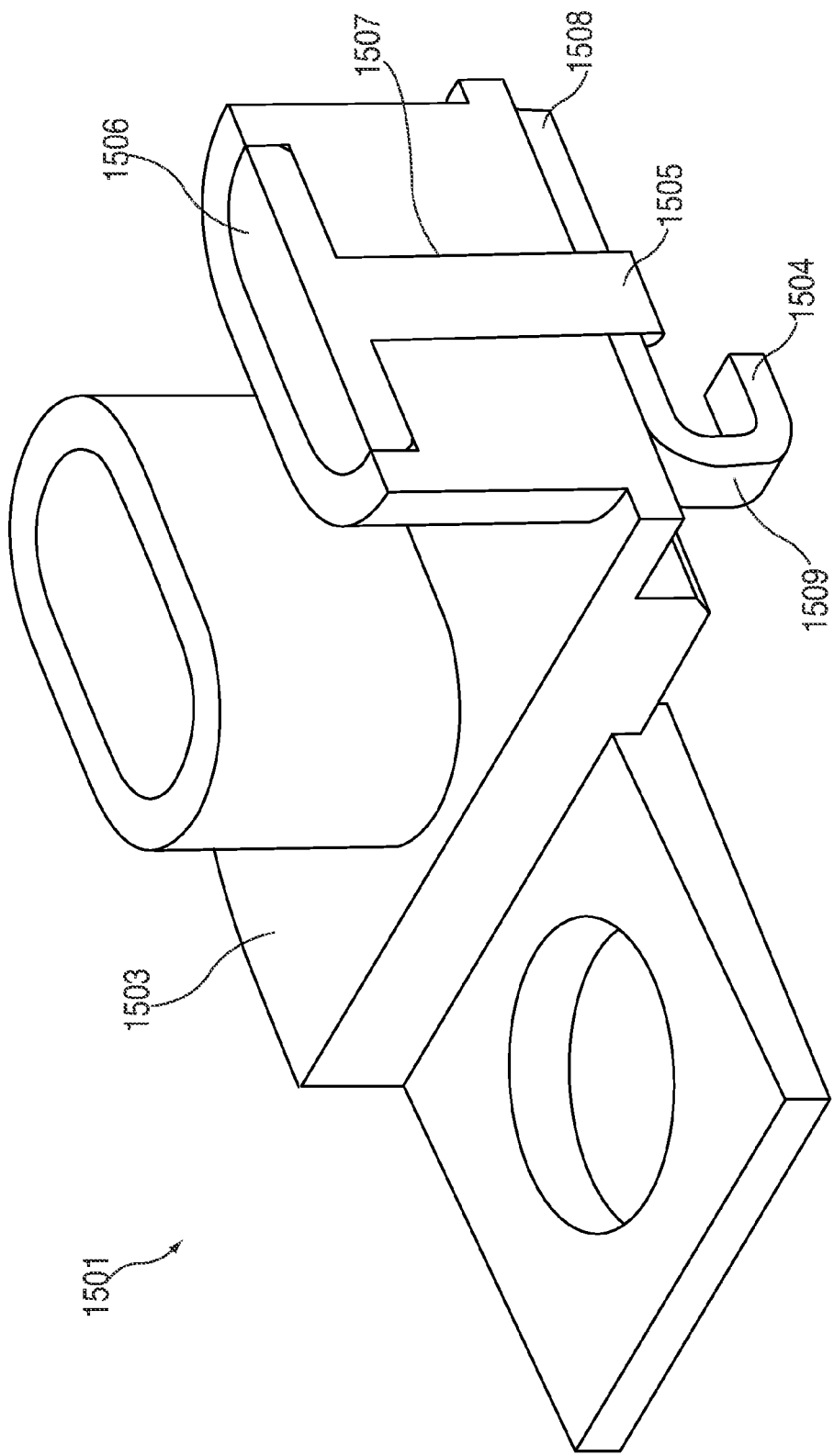

FIGS. 15A and 15B illustrate an assembly of electrical contacts in accordance with one embodiment of the present invention. Assembly 1501 can include plurality of electrical contacts 1502 disposed in non-conductive casing 1503. Each electrical contact 1502 can have first portion 1505 and second portion 1504, each of which are manufactured independently and assembled together thereafter.

First portion 1505 can have head 1506 and shank 1507. Head 1506 can have an exposed surface for engagement with an external electrical contact of, for example, a connector on a charging dock or cable. In one embodiment of the present invention, the exposed surface on head 1506 can have a conductive, durable finish that also is aesthetically appealing, for example, nickel, tin cobalt, or a blackened finish. Shank 1507 can be integrally formed with head 1506 or formed independently and then attached to head 1506 using adhesive material (e.g., glue, solder, weld, surface mount adhesion material, etc.). For example, during manufacturing, first portion 1505 can be formed from a cylindrical block of conductive material, turned to create shank 1507, and stamped or milled to shape head 1506, for example, into an oval shape.

Second portion 1504 can have engagement segment 1509 and contact segment 1508. Engagement segment 1509 can have a hole configured for accepting shank 1507 of first portion 1505 during assembly of electrical contact 1502 to casing 1503. Conductive adhesive material can be applied during manufacturing to mechanically and electrically couple first portion 1505 and second portion 1504 of electrical contact 1502. Contact segment 1508 can have an internal surface for engagement with electrical contact 1404 on circuit board 1405 (see FIG. 14) when in an assembled headset. The engagement surface of contact segment 1508 also can have a finish (e.g., gold-plating) that has good properties for adhering electrical contact 1502 to circuit board 1405, storage, and corrosion-resistance.

In one embodiment of the present invention, the center of the internal contact surface of second portion 1504 can be offset from the center of the external surface of first portion 1505 when considered in a plane substantially defined by the external contact surface of first portion 1505. This can be useful when design constraints require electrical contacts 1502 to electrically couple electronic components that are not co-linearly aligned, as in one embodiment of the present invention illustrated in FIG. 14. In one embodiment of the present invention, second portion 1504 can have a hook-shape to position the internal contact surface of second portion 1504 in an offset configuration with respect to shank 1507. In manufacturing, second portion 1504 can be stamped from sheet metal, machined from a solid block of conductive material, molded, or formed using a different method known in the art or otherwise. In one embodiment of the present invention, second portion 1504 can be stamped from sheet metal in high volume production situations to save valuable time and money.

Figure 16A:
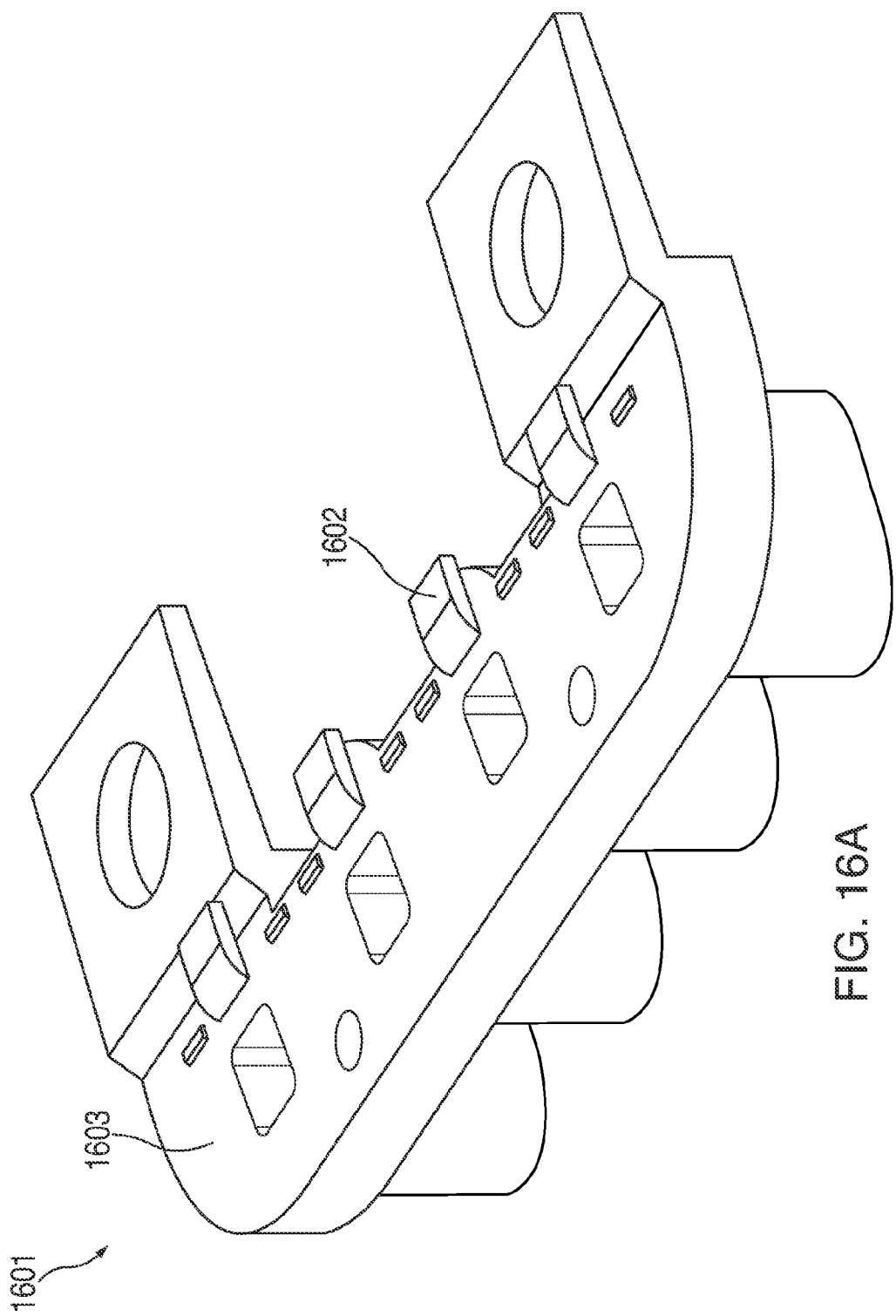
Figure 16C:
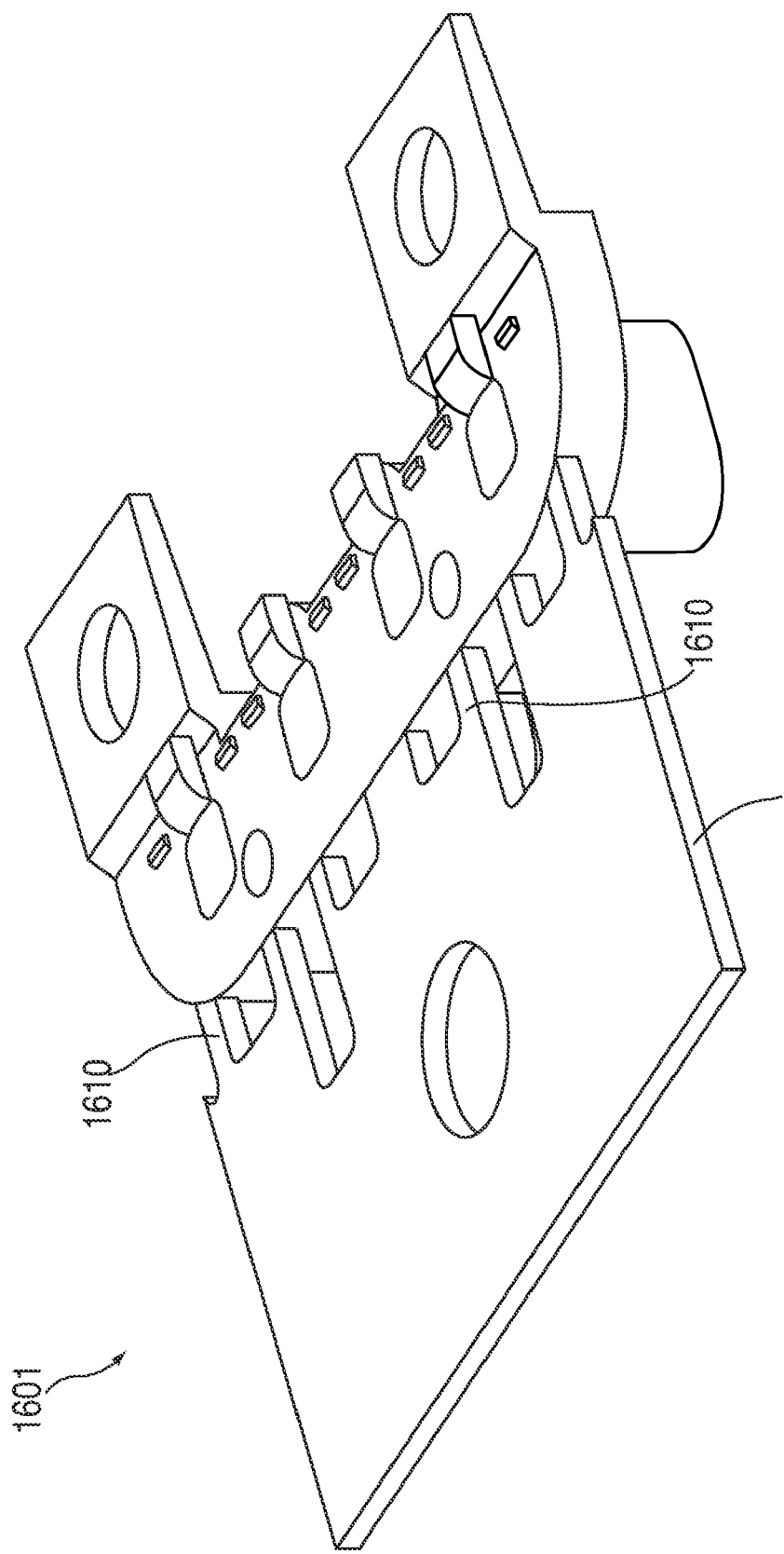

FIGS. 16A-16C illustrate an assembly of electrical contacts in accordance with another embodiment of the present invention. Assembly 1601 can include plurality of electrical contacts 1602 disposed in non-conductive casing 1603. Similar to the embodiment illustrated in FIGS. 15A-15B, each electrical contact 1602 can have first portion 1605 and second portion 1604, each of which are manufactured independently and assembled together thereafter.

First portion 1605 can have an exposed surface for engagement with an external electrical contact of, for example, a connector on a charging dock or cable. In one embodiment of the present invention, the exposed surface on first portion 1605 can have a conductive, durable finish that also is aesthetically appealing.

Second portion 1604 can have engagement segment 1606, shank 1607, and contact segment 1608. Engagement segment 1606 can be electrically and mechanically coupled to first portion 1605 using, for example, surface mount technology, solder, weld, or another conductive adhesive. Shank 1607 can couple engagement segment 1606 to contact segment 1608. Contact segment 1608 can have an internal surface for engagement with electrical contact 1404 on circuit board 1405 (see FIG. 14) when headset assembly 1601 is installed in a headset (e.g., headset 10 of FIG. 1). The engagement surface of contact segment 1608 also can have a finish that has good properties for soldering, storage, and corrosion-resistance.

In one embodiment of the present invention, the center of the internal contact surface of contact segment 1608 can be offset from the center of the external surface of first portion 1605 when considered in a plane substantially defined by the external contact surface of first portion 1605. In one embodiment of the present invention, second portion 1604 also can have a hook-shape to position the internal contact surface of second portion 1604 in an offset configuration with respect to the external contact surface of first portion 1605.

FIG. 16C illustrates how assembly 1601 can be manufactured in accordance with one embodiment of the present invention. Initially, second portions 1604 of one or more electrical contacts 1602 can be stamped from single piece of sheet metal 1609 and folded into, e.g., a hook-shape as described above. This can create fingers 1610 in sheet metal 1609 that mechanically and electrically couple all electrical contacts 1602. First portions 1605, which also can be stamped in a separate operation, then can be adhered to engagement segments 1606 of each second portion 1604. This assembly then can be placed in an injection molding machine to injection-mold casing 1603 around the assembly. Once the injection molding procedure is complete, a blade can sever second portions 1604 of electrical contacts 1602 from the rest of sheet metal 1609, thereby mechanically and electrically decoupling each electrical contact 1602 from the other electrical contacts. Advantageously, because first portions 1605 and second portions 1604 can be formed from a stamping process, assembly 1601 can be used in high volume production situations by saving valuable time and money.

Figure 17B:
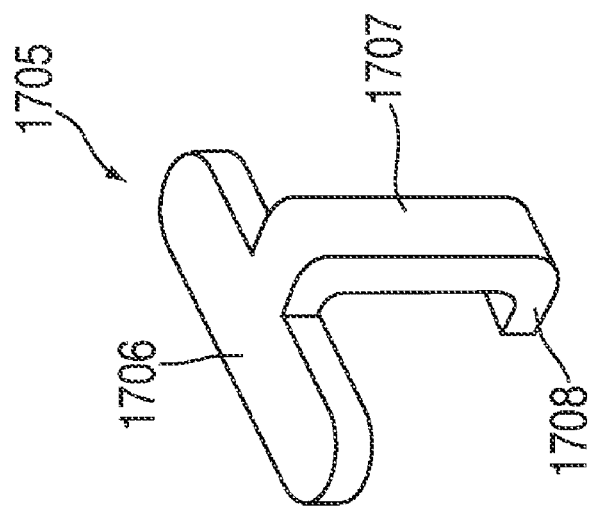
FIGS. 17A and 17B are illustrations of electrical contacts in accordance with an embodiment of the present invention.
Figure 17A:
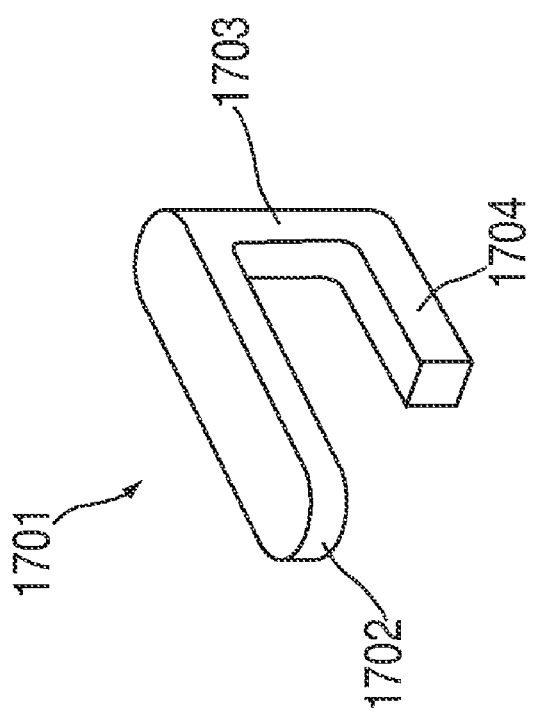

FIGS. 17A and 17B illustrate electrical contacts in accordance with further embodiments of the present invention. Electrical contacts 1701 and 1705 can be similar to that described above with respect to FIGS. 15A-16C, except that electrical contacts 1701 and 1705 can be formed as one unitary piece.

Electrical contact 1701 can have external contact portion 1702, shank 1703, and internal contact portion 1704. External contact portion 1702 can have an external surface for engagement with an external electrical contact of, for example, a connector on a charging dock or cable. Shank 1703 can couple external contact portion 1702 to internal contact portion 1704. Internal contact portion 1704 can have an internal surface for engagement with electrical contact 1404 on circuit board 1405 (see FIG. 14) when electrical contact 1701 is installed in a headset (e.g., headset 10 of FIG. 1). As in the above-described embodiments, the center of the internal contact surface of internal contact portion 1704 can be offset from the center of external contact portion 1702 when considered in a plane substantially defined by the external contact surface of external contact portion 1702. Electrical contact 1701 also can have a hook-shape to position the internal contact surface of internal contact portion 1704 in an offset configuration with respect to the center of external contact portion 1702. In one embodiment of the present invention, electrical contact 1701 can be machined from a single block of conductive material.

Similar to electrical contact 1701, electrical contact 1705 also can have external contact portion 1706, shank 1707, and internal contact portion 1708. Rather than being machined from a conductive material, however, electrical contact 1705 can be stamped from sheet metal and folded to form the hook-shape. Again, because the electrical contact can be manufactured using a stamping procedure, it can be used in high volume production situations.

Although particular embodiments of the present invention have been described above in detail, it will be understood that this description is merely for purposes of illustration. Alternative embodiments of those described herein are also within the scope of the present invention. For example, while one embodiment can include a Bluetooth headset, one or more features of the present invention also can be incorporated into headsets employing other wired and/or wireless communication protocols. Also, while some embodiments of the present invention can include headsets configured for communication with a cellular phone and/or personal media device (e.g., a portable media player similar to that sold under the trademark iPod® by Apple Inc. of Cupertino, Calif.), one or more features of the present invention can also be incorporated into headsets configured for communication with any electronic device. Furthermore, while one embodiment illustratively described above can include a headset and methods for fabricating the same, one or more features of the present invention can also be incorporated into other electronic devices that require, e.g., circuit boards distributed within small acoustic volumes, symmetric connectors, extruded housings having one or more internal features, microperforations, co-located microphones and connectors, magnetic connectors, or any combination thereof.

Various configurations described herein may be combined without departing from the present invention. The above described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A connector assembly comprising:
   a connector plate with a first side, a second side and at least two lumens extending from the first side to the second side;
   a non-conductive casing disposed at least partially within the at least two lumens;
   at least two exposed contacts adjacent to the first side of the connector plate;
   at least two internal contacts adjacent to the second side of the connector plate; and
   at least two conductive paths through the non-conductive casing, wherein each of the conductive paths electrically couples a respective one of the exposed contacts with a respective one of the internal contacts.

2. The connector assembly of claim 1, wherein:
   each exposed contact has a contact surface;
   a plane defined by first and second orthogonal axes contains each of the contact surfaces; and
   a center of each internal contact is offset, in the plane, from a center of a respective exposed contact.

3. The connector assembly of claim 2, wherein the conductive paths have a hook shape to accommodate the offset.

4. The connector assembly of claim 1, wherein the internal contacts are electrically coupled with corresponding contacts on a circuit board inside an electronic device.

5. The connector assembly of claim 1, wherein the non-conductive casing comprises:
   at least two protruding members, each protruding member extending into a respective one of the lumens.

6. The connector assembly of claim 5, wherein each of the exposed contacts is located on a distal end of a respective one of the protruding members.

7. The connector assembly of claim 5, wherein each of the conductive paths extends through a respective one of the protruding members.

8. The connector assembly of claim 1, wherein the connector plate is formed from a ferromagnetic material.

9. A connector assembly comprising:
   a connector plate with a first side, a second side and at least two lumens extending from the first side to the second side;
   at least two exposed contacts, the exposed contacts being closer to the first side of the connector plate than the second side of the connector plate;
   at least two internal contacts, the internal contacts being closer to the second side of the connector plate than the first side of the connector plate; and
   at least two conductive paths, each conductive path extending through a respective one of the lumens and electrically coupling a respective one of the exposed contacts with a respective one of the internal contacts.

10. The connector assembly of claim 9, further comprising:
    a non-conductive casing disposed at least partially within the lumens and electrically isolating the conductive paths from the connector plate.

11. The connector assembly of claim 10, wherein:
    the non-conductive casing is a single piece of non-conductive material;
    the non-conductive casing comprises at least two protruding members, each protruding member extending into a respective one of the lumens; and each of the exposed contacts is located on a distal end of a respective one of the protruding members.

12. The connector assembly of claim 9, wherein:
each exposed contact has a contact surface;
a plane defined by first and second orthogonal axes contains each of the contact surfaces; and
a center of each internal contact is offset, in the plane, from a center of a respective exposed contact.

13. The connector assembly of claim 12, wherein the conductive paths have a hook shape to accommodate the offset.

14. The connector assembly of claim 9, wherein the connector plate is formed from a ferromagnetic material.

15. A connector assembly comprising:
a connector plate with at least two lumens extending through the connector plate;
a non-conductive casing coupled with the connector plate, the non-conductive casing comprising at least two protruding members and each protruding member extending into a respective one of the lumens; and
at least two external contacts, each external contact disposed on a distal end of a respective one of the protruding members.

16. The connector assembly of claim 15, further comprising:
at least two internal contacts on an opposite side of the connector plate from the external contacts; and
at least two conductive paths, each conductive path extending through a respective one of the lumens and electrically coupling a respective one of the external contacts with a respective one of the internal contacts.

17. The connector assembly of claim 16, wherein:
each external contact has a contact surface;
a plane defined by first and second orthogonal axes contains each of the contact surfaces; and
a center of each internal contact is offset, in the plane, from a center of a respective external contact.

18. The connector assembly of claim 15, wherein the non-conductive casing electrically isolates the connector plate from the external contacts.

19. The connector assembly of claim 15, wherein an outer surface of each external contact is substantially parallel with an outer surface of the connector plate.

20. The connector assembly of claim 15, wherein the connector plate is ferromagnetic.

21. A connector assembly for coupling with a complementary connector, the connector assembly comprising:
a connector plate surface forming a first mating surface portion of a mating surface for abutting the complementary connector;
a first contact surface forming a second mating surface portion of the mating surface; and
a second contact surface forming a third mating surface portion of the mating surface, wherein a part of the first mating surface portion separates the second mating surface portion from the third mating surface portion.

22. The connector assembly of claim 21, wherein:
another part of the first mating surface portion defines a periphery of the mating surface; and
each of the second and third mating surface portions is entirely within the periphery.

23. The connector assembly of claim 21, wherein:
the connector plate surface comprises a first aperture and a second aperture;
the first contact surface is disposed in the first aperture; and
the second contact surface is disposed in the second aperture.

24. The connector assembly of claim 21, further comprising:
a non-conductive casing disposed between the first contact surface and the connector plate surface and between the second contact surface and the connector plate surface.

25. The connector assembly of claim 21, further comprising:
a non-conductive casing, wherein:
a first surface of the non-conductive casing forms a fourth mating surface portion surrounding the second mating surface portion; and
a second surface of the non-conductive casing forms a fifth mating surface portion surrounding the third mating surface portion.

26. The connector assembly of claim 21, wherein the connector plate surface is formed from a ferromagnetic material.

27. The connector assembly of claim 21, wherein the first mating surface portion makes up a majority of the mating surface.

* * * * *

UNITED STATES PATENT AND TRADEMARK OFFICE
CERTIFICATE OF CORRECTION

| | | |
|---|---|---|
| PATENT NO. | : 7,942,678 B2 | Page 1 of 1 |
| APPLICATION NO. | : 12/869319 | |
| DATED | : May 17, 2011 | |
| INVENTOR(S) | : Emery A. Sanford et al. | |

It is certified that error appears in the above-identified patent and that said Letters Patent is hereby corrected as shown below:

In column 1, line 48, delete "2007 ," and insert -- 2007, --, therefor.

In column 17, line 63, after "headset" insert -- . --.

Signed and Sealed this
Sixth Day of December, 2011

David J. Kappos
*Director of the United States Patent and Trademark Office*